US012559230B2

(12) United States Patent
Page

(10) Patent No.: US 12,559,230 B2
(45) Date of Patent: Feb. 24, 2026

(54) BLENDED WING BODY AIRCRAFT WITH LANDING GEAR AFT OF A REAR SPAR

(71) Applicant: JetZero, Inc., Long Beach, CA (US)

(72) Inventor: Mark Allan Page, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/416,205

(22) Filed: Jan. 18, 2024

(65) Prior Publication Data

US 2025/0236385 A1    Jul. 24, 2025

(51) Int. Cl.
*B64C 25/04*      (2006.01)
*B64C 25/00*      (2006.01)
*B64C 39/10*      (2006.01)

(52) U.S. Cl.
CPC ............. *B64C 25/04* (2013.01); *B64C 39/10* (2013.01); *B64C 2025/008* (2013.01); *B64C 2039/105* (2013.01)

(58) Field of Classification Search
CPC .............. B64C 25/04; B64C 2039/105; B64C 2025/008
See application file for complete search history.

(56) References Cited

U.S. PATENT DOCUMENTS

| | | | |
|---|---|---|---|
| 1,716,439 | A | 6/1929 | Edrington |
| 1,810,244 | A | 6/1931 | Hicks |
| 1,853,232 | A | 4/1932 | Alfred |

| | | | |
|---|---|---|---|
| 2,138,326 | A | 11/1938 | Robert |
| 4,524,929 | A | 6/1985 | Gebhard |
| 4,687,158 | A | 8/1987 | Kettering |
| 6,568,632 | B2 | 5/2003 | Page et al. |
| 6,666,406 | B2 | 12/2003 | Sankrithi et al. |
| 6,772,977 | B2 | 8/2004 | Dees |
| 6,942,182 | B2 | 9/2005 | Quayle |
| 7,143,975 | B2 | 12/2006 | Udall |
| 7,249,736 | B2 | 7/2007 | Clark |

(Continued)

FOREIGN PATENT DOCUMENTS

| | | |
|---|---|---|
| FR | 3018501 A1 | 12/2017 |
| GB | 1593393 A | 7/1981 |

(Continued)

OTHER PUBLICATIONS

Rizzi, Landing Gear Design for Blended Wing Body Flight Test Demonstrations, Dec. 5, 2018.

(Continued)

*Primary Examiner* — Richard Green
*Assistant Examiner* — Nevena Aleksic
(74) *Attorney, Agent, or Firm* — Jeffrey Schox

(57)          ABSTRACT

An aircraft including a blended wing body aircraft (BWB) having a main body and wings with no clear demarcation between the wings and the main body along a leading edge of the aircraft, a rear spar located within the main body, one or more gear wells located on a lower surface of the rear spar, a landing gear system having at least a main gear the at least a main gear situated in one of the one or more gear wells, and one or more propulsors located directly above the one or more gear wells, wherein at least one propulsor is located over the at least one gear well of the one or more gear wells.

18 Claims, 9 Drawing Sheets

(56)          References Cited

U.S. PATENT DOCUMENTS

| | | | |
|---|---|---|---|
| 8,113,464 | B2 * | 2/2012 | Cazals ................... B64D 27/20 |
| | | | 244/45 R |
| 8,366,050 | B2 | 2/2013 | Odle et al. |
| 8,608,109 | B2 | 12/2013 | Campbell |
| 9,387,930 | B2 | 7/2016 | Dornwald et al. |
| 9,499,256 | B2 | 11/2016 | Nakashima |
| 9,611,039 | B2 | 4/2017 | Lieven et al. |
| 10,150,558 | B2 | 12/2018 | Page |
| 11,052,989 | B2 * | 7/2021 | Livieratos ................. B64C 9/10 |
| 11,062,649 | B2 | 7/2021 | Kim et al. |
| 11,136,114 | B2 | 10/2021 | Rowlands et al. |
| 11,186,359 | B2 | 11/2021 | Page |
| 11,247,776 | B2 | 2/2022 | Princen et al. |
| 11,396,365 | B2 | 7/2022 | Page |
| 11,433,991 | B2 | 9/2022 | Whitlock et al. |
| 11,453,483 | B2 | 9/2022 | Page |
| 11,801,932 | B2 | 10/2023 | Schuster et al. |
| 11,827,339 | B1 | 11/2023 | Page |
| 2002/0145075 | A1 * | 10/2002 | Page ...................... B64U 10/20 |
| | | | 244/36 |
| 2005/0178912 | A1 * | 8/2005 | Whelan .................... B64C 1/10 |
| | | | 244/120 |
| 2009/0187293 | A1 | 7/2009 | Trotter et al. |
| 2010/0233424 | A1 | 9/2010 | Dan-Jumbo et al. |
| 2011/0039057 | A1 | 2/2011 | Frisch et al. |
| 2013/0099053 | A1 | 4/2013 | Barmichev et al. |
| 2013/0146710 | A1 * | 6/2013 | Bernadet ................. B64C 25/14 |
| | | | 244/119 |
| 2015/0259074 | A1 * | 9/2015 | Guillemaut ............ B64D 27/40 |
| | | | 244/54 |
| 2016/0375989 | A1 * | 12/2016 | Simonneaux ........... B64C 25/12 |
| | | | 29/897.2 |
| 2018/0001999 | A1 * | 1/2018 | Page ...................... B64C 25/14 |
| 2019/0086936 | A1 | 3/2019 | Schrage et al. |
| 2019/0389581 | A1 | 12/2019 | Chittick et al. |
| 2020/0207463 | A1 | 7/2020 | Schuster et al. |
| 2020/0207464 | A1 | 7/2020 | Whitlock et al. |
| 2021/0024203 | A1 | 1/2021 | Chappell et al. |
| 2021/0253246 | A1 | 8/2021 | Tibbitts et al. |
| 2022/0001794 | A1 | 1/2022 | Morimura |
| 2022/0001974 | A1 * | 1/2022 | Page ...................... B64C 39/10 |
| 2022/0063822 | A1 | 3/2022 | Dakhil |
| 2022/0194565 | A1 | 6/2022 | Wilson |
| 2022/0348318 | A1 | 11/2022 | Howell et al. |
| 2022/0380027 | A1 | 12/2022 | Whitlock et al. |
| 2022/0388633 | A1 | 12/2022 | Page et al. |
| 2023/0002037 | A1 | 1/2023 | Page |
| 2023/0091929 | A1 | 3/2023 | Atreya et al. |
| 2023/0242246 | A1 | 8/2023 | Page et al. |

FOREIGN PATENT DOCUMENTS

| | | |
|---|---|---|
| GB | 2410728 A | 8/2005 |
| WO | 2005062743 A2 | 7/2005 |
| WO | 2007117260 A2 | 10/2007 |

OTHER PUBLICATIONS

Jenkins, E.S., and Donovan, A.F., "Tricycle Landing Gear Design—Part 1", Journal of the Aeronautical Sciences, vol. 9, No. 10, pp. 385-396, Aug. 1942, doi: 10.2514/8.10912 (Year: 1942).

Taufiq Mulyanto; M. Luthfi Imam Nurhakim , Conceptual Design of Blended Wing Body Business Jet Aircraft, Dec. 31, 2013.

Bruce I. Larrimer, Beyond Tube-and-Wing, Dec. 31, 2020.

Randhir Brar, Design of a Blended Wing Body Aircraft, Dec. 31, 2014.

N/A, B-2 Spirit Departure |Great View of Landing Gear Retraction| Stewardess | Cabin Crew Life |#Shorts, Oct. 2, 2021.

Fabrizio Rizzi, Landing Gear Design for Blended Wing Body Flight Test Demonstrators, Nov. 30, 2018.

Sunpeth Cumnuanti, Landing Gear Conceptual Design and Structural Optimization of a Large Blended Wing Body Civil Transport Aircraft, Dec. 31, 2015.

* cited by examiner

400

416

412

408

404

420a

420b

424

BLENDED WING BODY AIRCRAFT WITH LANDING GEAR AFT OF A REAR SPAR

FIELD OF THE INVENTION

The present invention generally relates to the field of blended wing body aircraft. In particular, the present invention is directed to blended wing body aircraft with landing gear located aft of a rear spar.

BACKGROUND

Conventional tube and wing aircraft include landing gear systems beneath a main body of the aircraft. These landing gear systems create an aircraft having a larger cross section. The larger cross section causes increased drag without the benefit of additional space for passengers or cargo. Similarly landing gear systems located within a wing of an aircraft may cause an increase in the cross section of the wing due to storage of the landing gear system. Placement of a landing gear system on the wing of an aircraft may cause increased aerodynamic drag as well as less space for fuel.

SUMMARY OF THE DISCLOSURE

In an aspect, an aircraft is described. Aircraft includes a blended wing body aircraft (BWB) having a main body and wings with no clear demarcation between the wings and the main body along a leading edge of the aircraft, a rear spar located within the main body, one or more gear wells located on a lower surface of the aircraft, a landing gear system having at least a main gear the at least a main gear situated in one of the one or more gear wells, and one or more propulsors located directly above the one or more gear wells, wherein at least one propulsor is located over the at least one gear well of the one or more gear wells.

In another aspect, an aircraft may include a blended wing body aircraft (BWB) having a main body and wings with no clear demarcation between the wings and the main body along a leading edge of the aircraft, a rear spar located within the main body, one or more gear wells located on a lower surface of the aircraft, wherein at least one gear well of the one or more gear wells includes a through hole extending from a lower surface of the BWB aircraft and in a direction of the upper surface of the BWB aircraft, a landing gear system having at least a main gear, the at least a main gear situated in one of the one or more gear wells and at least a propulsor situated on an upper surface of the aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure relate to an aircraft with landing gear located aft of a rear spar of the aircraft. Aspects of this disclosure allow for increased aerodynamic efficiency due to minimized aircraft cross section. Aspects of this disclosure further allow for access to propulsion systems located an upper surface of the aircraft. Aspects of this disclosure further allow for increased fuel storage within a wing of the aircraft.

Figure 1:
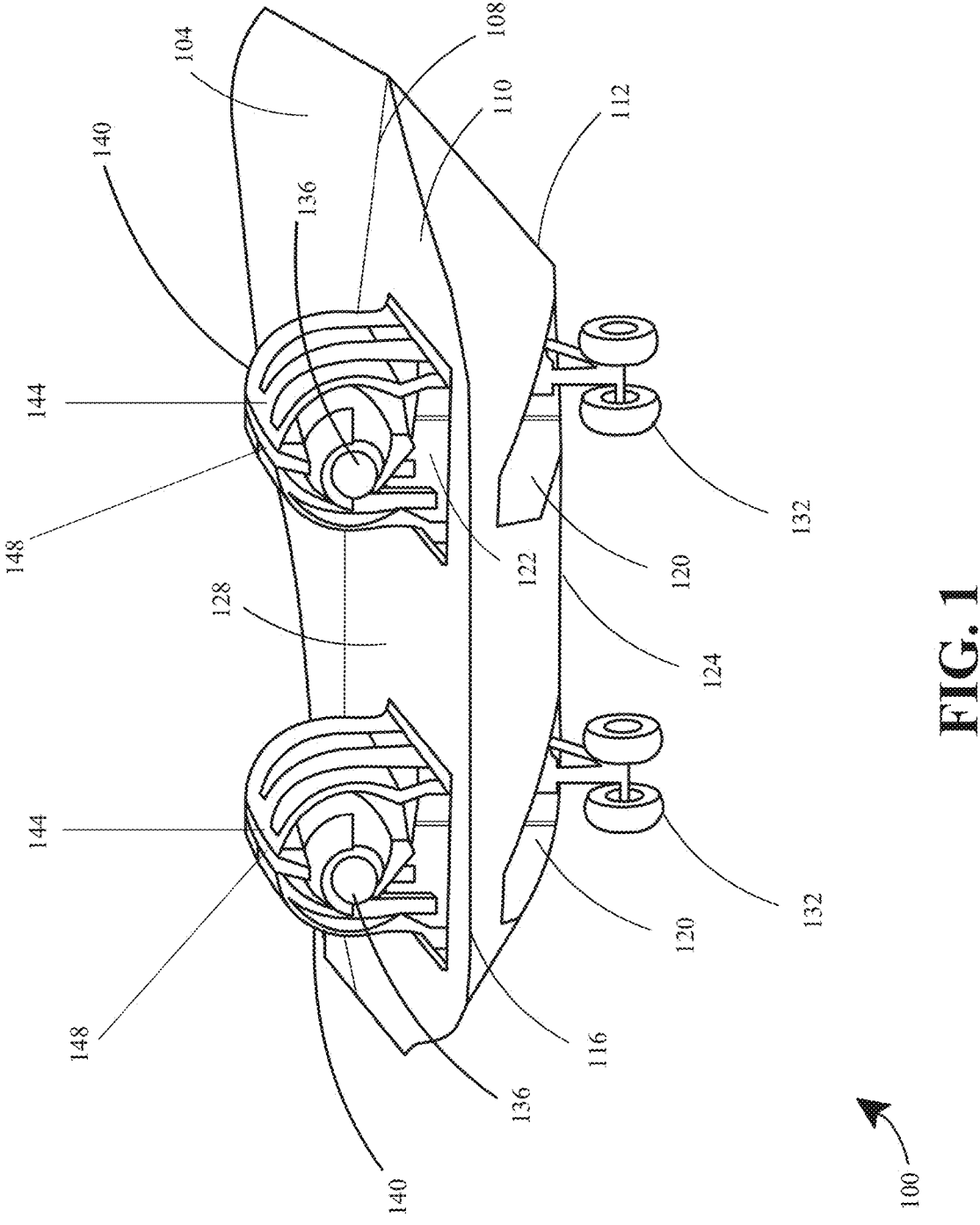
FIG. 1 is an illustration of a rear portion of an aircraft in accordance with the subject disclosure.

Referring now to FIG. 1, an exemplary embodiment of a rear portion of an aircraft 100, being any as described throughout this disclosure is illustrated. In one or more embodiments, aircraft 100 may include a blended wing body (BWB) aircraft 100, such as a BWB aircraft 100 as described in reference to at least FIG. 5. In one or more embodiments, aircraft 100 may include a blended wing body aircraft 100 having a main body 104 and wings with no clear demarcation between the wings and the main body 104 along a leading edge of the aircraft 100. "Main body" for the purposes of this disclosure is a central structure of aircraft 100 in which passengers, personnel or cargo, landing gear and the like may be situated. For example, and without limitation, main body may include a passenger cabin, a cargo bay, and the like. In one or more embodiments, main body 104 may include a fuselage of aircraft 100. In one or more embodiments, fuselage may include main body 104 and a rear spar 108 within main body 108. In one or more embodiments, main body 104 may include a passenger compartment wherein passengers may be situated during flight. In one or more embodiments, BWB may include an outer mold line 112. In one or more embodiments, an outer mold line 112 of BWB may be formed by a carbon fiber material such as any carbon fiber material as described in reference to at least FIG. 8.

With continued reference to FIG. 1, aircraft 100 may include a rear spar 108 located within main body 104, wherein the rear spar is configured to contain a pressure vessel. A "rear spar," as used herein, is the aft pressure bulkhead for a cabin pressure vessel. "Cabin pressure vessel" for the purposes of this disclosure refers to a sealed structure within aircraft. For example, and without limitation, cabin pressure vessel may include the passenger compartment of aircraft 100, main body 104 or a portion thereof, the cargo compartment of aircraft and the like. In one or more embodiments, a cabin pressure vessel may contain pressure within an aircraft 100 to allow for suitable conditions for passengers and aircraft personnel. In one or more embodiments, cabin pressure vessel may contain pressure within the aircraft 100 and allow for a pressure difference between the interior of the cabin pressure vessel and the exterior of aircraft 100. In one or more embodiments main body 104 may include and/or be included within cabin pressure vessel. In one or more embodiments, rear spar 108 may be configured to contain a pressure within cabin pressure vessel. In one or more embodiments, rear spar 108 may be configured to form a portion of cabin pressure vessel. In one or more embodiments, rear spar 108 may be configured to form an aft portion of cabin pressure vessel. In one or more embodiments, rear spar 108 may serve as a structural component for cabin pressure vessel to contain the pressure within the cabin pressure vessel. In one or more embodiments, rear spar 108 may include rubs running longitudinally from an upper surface of aircraft to a lower surface of aircraft 100. In one or more embodiments, rear spar 108 may include a pressure bulkhead to contain the pressurized section of aircraft 100. Rear spar 108 may include structural element such as a rib within main body 104. In one or more embodiments, rear spar 108 may serve as a structural component for one or more aircraft 100 components such as but not limited to, main body 104, a landing gear system, a propulsor 136 and the like. In one or more embodiments, rear spar 108 may contain a structural element similar to that of a spar of an aircraft 100 wing. In one or more embodiments, rear spar may be located within an aft portion of main body 104 wherein rear spar 108 may be located closer to a tail or an aft portion 116 of aircraft 100. "Aft portion" for the purposes of this disclosure refers to the back half of a component. For example, and without limitation, an aft portion of an aircraft may refer to back half of the aircraft, wherein the front of the aircraft may contain a nose and the rear of the aircraft may contain a tail. In one or more embodiments, aft portion may include a portion of a component spanning from the midsection until the back of the component. In one or more embodiments, rear spar 108 may be located within an aft portion of main body 108 wherein rear spar may be located in a back half of main body 104. In one or more embodiments, ribs may be orthogonal to rear spar 108 wherein ribs may be positioned within aft portion 116 of aircraft 100 and a extend in a direction towards a nose of aircraft 100. In one or more embodiments, stringers and/or frames may run orthogonal to ribs. In one or more embodiments, rear spar 108 may serve as a pressure bulkhead for a pressure vessel. "Pressure bulkhead" for the purposes of this disclosure is a component of an aircraft 100 airframe that serves to contain the pressurized section of an aircraft 100 and separate the pressurized section from other non-pressurized areas. For example, and without limitation, a pressurized section may include a main body 104 wherein passengers may be located within main body 104. In one or more embodiments, rear spar 108 may serve as a rear pressure bulkhead of aircraft 100 wherein main body 104 may be contained by the structure provided by rear spar 108. In one or more embodiments, aircraft 100 may include a pressure vessel wherein rear spar 108 may be configured to contain the pressure vessel or a portion thereof. Pressure vessel may be described in further detail below such as in reference to FIG. 2.

With continued reference to FIG. 1, in one or more embodiments, aircraft 100 may contain a convergent aft centerbody 110 aft of rear spar 108. In one or more embodiments, main body 104 may contain a passenger compartment and convergent aft centerbody 110 wherein rear spar 108 separates passenger compartment from convergent aft centerbody 110. "Convergent aft centerbody" for the purposes of this disclosure refers to portion of main body 104 situated aft of rear spar 108. In one or more embodiments, convergent aft centerbody 110 may be located within an aft portion 116 of aircraft 100. In one or more embodiments, convergent aft centerbody may contain a tapering shape. In one or more embodiments, convergent aft centerbody 110 may include an unpressurized portion of aircraft 100. In one or more embodiments, aircraft components such as propulsors, landing gear and the like may be located on convergent aft centerbody 110. In one or more embodiments, a fuselage and/or main body of aircraft may be divided into at least two sections wherein a first section may include a passenger compartment and a second section may include a convergent aft centerbody 110 located aft of the passenger compartment. In one or more embodiments, rear spar 108 may separate convergent aft centerbody 110 from passenger compartment. In one or more embodiments, convergent aft centerbody 110 may increase in thickness from rear spar 108 in a direction towards a tail or trailing edge of aircraft 100. In one or more embodiments, thickness may be defined as a length between an upper surface of aircraft 100 in a direction of lower surface of aircraft 100. In one or more embodiments, convergent aft centerbody 110 may predominantly take the form of a triangular prism wherein an edge of the prism may be located at or near a tail or trailing edge of aircraft 100 and the lateral faces of the prism may contain an upper and lower surface of aircraft 100. In one or more embodiments, aircraft 100 may include a main body 104 wherein convergent aft centerbody 110 may be located within an aft portion of main body 104. In one or more embodiments, convergent aft centerbody 110 may include a frame, wherein the frame may provide for the primary support of convergent aft centerbody 110. In one or more embodiments rear spar may be configured to provide support to convergent aft centerbody 110 and/or main body 104. In one or more embodiments, convergent aft centerbody 110 may further include stringers running orthogonally to frame and configured to provides structural support in an orthogonal direction and to distribute loads along frame. "Stringer" for the purposes of this disclosure is a structural component configured to provide structural support in a direction orthogonal to a frame of the aircraft. In one or more embodiments, stringers may be used to prevent movement of frames within an aircraft structure. In one or more embodiments, stringers may provide for additional structural elements in which an outer mold line skin of aircraft may be adhered to. In one or more embodiments, frame may further include ribs connected to the frames to provide additional structural support within convergent aft centerbody 110. In one or more embodiments, rear spar 108, convergent aft centerbody 110 and/or components thereof may include a carbon fiber material such as any carbon fiber material as described in reference to at least FIG. 8.

With continued reference to FIG. 1, aircraft 100 may include one or more gear wells 120 situated on a lower surface 124 of convergent aft centerbody 110. In one or more embodiments, one or more gear wells 120 may be situated aft of rear spar 108. In one or more embodiments, one or more gear wells 120 may be situated aft of rear spar 108 and on convergent aft centerbody 110. In one or more embodiments, a location aft of rear spar 108 may be situated on convergent aft centerbody 110. "Gear well" for the purposes of this disclosure is an extruded portion of aircraft 100 that is configured to house a landing gear component. In one or more embodiments, gear well 120 may extend from a lower surface of an outer mold line 112 of aircraft 100 and/or convergent aft centerbody 110 in a direction of an upper surface of convergent aft centerbody 110 and/or aircraft 100. In one or more embodiments, convergent aft centerbody 110 may be wrapped in an outer mold line 112 skin wherein the outer mold line 112 skin includes the outer surface of an aircraft 100. In one or more embodiments, gear well 120 may include a through hole 122 that extends past the upper surface and the lower surface of aircraft 100. In one or more embodiment, gear well 120 may include a portion of aircraft 100 that is accessible to a frame, rib and/or stringer of convergent aft centerbody 110 or rear spar 108. In one or more embodiments, gear well 120 may provide for a housing of a landing gear wherein in a retract position, landing gear may be situated inside and within the boundary of the outer mold line 112 of the aircraft 100. In one or more embodiments, in a retracted position landing gear may be situated within gear well 120 wherein landing gear may not extend past a lower surface of aircraft 100. In one or more embodiments, landing gear well 120 may serve as an enclosed space or compartment in which landing gear may be situated during flight. In one or more embodiments, landing gear may be situated within gear well 120 and/or convergent aft centerbody 110 during flight in order to increase the aerodynamic efficiency of aircraft 100 during flight. In one or more embodiments, more than one landing gear wells 120 may be situated on a lower surface 124 of convergent aft centerbody 110 and/or aircraft 100. In one or more embodiments, more than one gear wells 120 may be situated a similar distance from rear spar 108 or a tail or trailing edge of aircraft 110 wherein more than one gear wells 120 may be parallel to one another about an axis. In one or more embodiments, at least one propulsor is located over at least one gear well 120 of the one or more gear wells 120. In one or more embodiments, landing gear wells 120 may be located on or within an aft portion of main body 104. In one or more embodiments, gear well 120 may extend from a lower surface 124 of convergent aft centerbody 110 in a direction of upper surface 128 of tail. In one or more embodiments, gear well 120 may extend from a lower surface 124 of convergent aft centerbody 110 through an upper surface 128 of convergent aft centerbody 110 wherein convergent aft centerbody 110 may include a through hole 122 from an upper surface 128 of convergent aft centerbody 110 to a lower surface 124 of convergent aft centerbody 110. In one or more embodiments, rear spar 108 may provide a structure for gear well. In one or more embodiments, gear well may be situated near rear spar on convergent aft centerbody 110. In one or more embodiments, gear well 120 may include a through hole 122 extending from a lower surface of aircraft 100 through an upper surface of aircraft 100.

With continued reference to FIG. 1, aircraft 100 may include a landing gear system. In one or more embodiments, BWB aircraft 100 may include a landing gear system, the landing gear system having a nose gear disposed proximate a front of the aircraft 100, the nose gear controllably movable between a first position in which the nose gear is retracted and/or at an upper limit, and a second position in which the nose gear is extended and/or at a lower limit. "Retracted" for the purposes of this disclosure refers to a positioning of one or more components of the landing gear system, wherein the components are not extended to their maximum capable length. In a non-limiting example, a component may be retracted wherein the component may extend outside of the outer mold line 112 but only a portion of its maximum capable length. Continuing, the component may be retracted when the component only extended half of its capable length. In a first position, nose gear may be retracted or stowed away within blended wing body and/or a main body 104 of the BWB. Nose gear may include a hinge, a swingarm, or any folding mechanism that may fold nose gear to store away into BWB and/or main body 104. In second position, nose gear may extend at or past a ground surface. "Extended" for the purposes of this disclosure is a positioning of one or more landing gear components outside of the outer mold line 112 wherein the components extend at least a portion of their maximum length. For example, a landing gear system may be extended wherein a component may extend a portion or the entirety of the maximum capable length. In one or more embodiments, a landing gear system may be extended and/or situated at an upper limit and a lower limit wherein the upper limit denotes the minimum length at which the landing gear may extend outside of the BWB body and still remain functional for use, while the lower limit may denote the maximum length at which the landing gear system may be extended. In one or more embodiments, an upper limit may indicate a landing gear that is extended outside of BWB; however the landing gear is extended as minimal as possible while still allowing for use of the landing gear for during takeoff and landing. In one or more embodiments, a lower limit may indicate the maximum allowable extension of the landing gear system wherein the landing gear system is extended its maximum allowable length. Landing gear system may further include a main gear 132 disposed proximate a rear of the aircraft 100, the main gear 132 controllably movable between a third position, in which the main gear 132 is extended and/or located at a lower limit, and a fourth position, in which the main gear 132 is retracted and/or located at an upper limit, wherein, in a ground position, the nose gear is in the first position and main gear 132 is in the third position and a fuselage of the aircraft 100 is substantially level with the ground. In a third position, main gear 132 may be extended at the same length as nose gear. In some embodiments, third position includes a position wherein main gear 132 is extended at or below ground surface relative to nose gear. In a fourth position main gear 132 may be retracted wherein main gear 132 is not fully extended. This may include main gear 132 being partially extended wherein main gear 132 is at or below ground surface. In an angle-of-attack (AOA) position, the nose gear is in the second position and the main gear 132 is in the fourth position and the fuselage of the aircraft 100 is rotated to a positive AOA with respect to the ground. In one or more embodiments, in a high lift position, the nose gear is in the second position and the main gear is in the fourth position and the fuselage of the BWB is rotated to a positive deck angle with respect to the ground. In one or more embodiments, in a high lift position, the flaps and slats of an aircraft are extended to allow for lift of the aircraft. In one or more embodiments, a high lift position may indicate a configuration of various components of an aircraft that will allow for flight and/or takeoff of the aircraft. "Deck angle" for the purposes of this disclosure is an angle between a passenger deck (or an arbitrary fuselage reference plane) and a ground or water level surface. In one or more embodiments, a positive deck angle refers to an angle of an aircraft wherein the nose of the aircraft may be situated above a tail of the aircraft with respect to a ground surface. In one or more embodiments, an aircraft during takeoff may contain a positive deck angle. In one or more embodiments, in a high lift position, BWB may contain a positive deck angle due to the configuration of the landing gear. In some embodiments, BWB may contain landing gear system configured to shorten required takeoff field length and/or landing field length. In some cases, BWB may be configured to land in areas that have a maximum takeoff field length of 8,340 ft and a required landing field length of 4,400 ft. In some embodiments, a required takeoff field length may be 8,340 ft or less. In some embodiments, required landing field length may be 4,400 ft, or less. For the purposes of this disclosure, a "landing field length" is the length of a runway on which an aircraft 100 is to land. For the purposes of this disclosure, a "required landing field length," is the length of the shortest runway on which an aircraft 100 is configured to land. For the purposes of this disclosure, a "takeoff field length" is the length of a runway on which an aircraft 100 is to takeoff. For the purposes of this disclosure a "required takeoff field length" is the length of the shortest runway on which an aircraft 100 is configured to be able to safely takeoff from. In one or more embodiments, the landing gear system may include a nose gear disposed proximate a front of the aircraft 100, the nose gear controllably movable between a first position in which the nose gear is retracted, and a second position in which the nose gear is extended and a main gear 132 disposed proximate a rear of the aircraft 100, the main gear 132 controllably movable between a third position, in which the main gear 132 is extended, and a fourth position, in which the main gear 132 is retracted. In one or more embodiments, in a ground position, the nose gear may be in the first position and main gear 132 may be in the third position and a fuselage of the aircraft 100 may be substantially level with the ground. In one or more embodiments, in an angle-of-attack (AOA) position, the nose gear may be in the second position and the main gear 132 may be in the fourth position and the fuselage of the aircraft 100 is rotated to a positive AOA with respect to the ground. In one or more embodiments, in a first position nose gear may be retracted wherein nose gear is retracted and located within the outer mold line 112 of BWB. Additionally or alternatively, in a second position nose gear may be extended wherein nose gear may be located outside the outer mold line 112. In one or more embodiments, in a third position and in a fourth position, a portion of main gear 132 may be situated and/or extended outside of gear well 120 and extend past a lower surface of aircraft 100. Landing gear system is described in further detail in reference to FIG. 7A-7B. Additional disclosure on landing gear systems may further be found in U.S. patent application Ser. No. 15/198, 611, filed on Jun. 30, 2016, and titled "TILTING LANDING GEAR SYSTEMS AND METHODS," having the entirety of which is incorporated by reference. Additional disclosure on landing gear systems may further be found in U.S. patent application Ser. No. 17/870,365, filed on Jul. 21, 2022, and titled "NON-COUPLED LANDING GEAR AIRCRAFT NOTIFICATION SYSTEM 100 AND METHODS OF USE," having the entirety of which is incorporated by reference. Additional disclosure on landing gear systems may further be found in U.S. patent application Ser. No. 16/730,108, filed on Dec. 30, 2019, and titled "SWING-ARM PIVOT PISTON LANDING GEAR SYSTEMS AND METHODS," having the entirety of which is incorporated by reference. Additional disclosure on landing gear systems may further be found in U.S. patent application Ser. No. 16/730,754, filed on Dec. 30, 2019, and titled "TILTING LANDING GEAR SYSTEMS AND METHODS having the entirety of which is incorporated by reference. Additional disclosure on landing gear systems may further be found in U.S. patent application Ser. No. 17/868,973, filed on Jul. 20, 2022, and titled "COUPLED LANDING GEAR AND METHODS OF USE," having the entirety of which is incorporated by reference.

With continued reference to FIG. 1, landing gear system may include at least one main gear 132. In one or more embodiments, landing gear system may include more than one main gear 132. In one or more embodiments, main gear 132 may be situated within gear well 120. In one or more embodiments, main gear 132 may be connected and/or fixed to rear spar 108. In one or more embodiments, main gear 132 and/or landing gear may be mounted to the aft pressure bulkhead/rear spar 108 via substantial fittings that may receive pins, shafts, bolts, etc. that support the main landing gear components. In turn, these fittings may distribute the concentrated landing gear component loads into the more diffuse rear spar structure. These substantial fittings may be integral to the rear spar 108, but they are nevertheless added to the rear spar 108 for the purpose of mounting the main gear 132 and not for being a rear spar. In one or more embodiments, main gear 132 may be connected to a frame of convergent aft centerbody 110. In one or more embodiments, main gear 132 may be connected to ribs of convergent aft centerbody 110. In one or more embodiments, rear spar 108 may be connected to ribs, wherein the ribs may be situated orthogonally to rear spar 108, wherein main gear 132 may be connected to the ribs. In one or more embodiments, convergent aft centerbody 110 may include a plurality of ribs connected to and/or orthogonal to rear spar. In one or more embodiments, ribs may include longitudinal structural elements within convergent aft centerbody configured to provide a structure to convergent aft centerbody 110. In one or more embodiments, main gear 132 may be connected to ribs of convergent aft centerbody 110. In one or more embodiments, each main gear 132 may be situated into a different gear well 120. In one or more embodiments, in a retracted position, an entity of main gear 132 may be situated within gear well 120. In one or more embodiments, main gear 132 may be connected to one or more ribs of convergent aft centerbody 110. In one or more embodiments, main gear 132 may contain a retracted position wherein in a retracted position main gear 132 may be folded and situated within gear well 120. In one or more embodiments, in an extended position main gear 132 may be extended and/or partially extended wherein main gear 132 may be extended outside of gear well 120 and outside of a boundary created by an outer mold line 112 of aircraft 100. In one or more embodiments, in a retraced position, main gear 132 may be situated within an aft portion of main body 104 and/or the pressure vessel. In one or more embodiments, in a retraced position, landing gear may be situated within a boundary created by rear spar 108. In one or more embodiments, main gear 132 may be situated aft of a passenger cabin. In one or more embodiments, main gear 132 may be situated behind a wings of aircraft 100. In one or more embodiments, main gear 132 may be situated between the wings of aircraft 100.

With continued reference to FIG. 1, landing gear system may contain a predominantly triangular shape, wherein a nose gear may be situated at an apex of the triangle and the main gears 132 may be situated at the bas ends of the triangle. In one or more embodiments, landing gear system may contain a predominantly isosceles triangle shape wherein nose gear may be situated an equal horizontal and vertical distance from each main gear 132. In one or more embodiments, With continued reference to FIG. 1, aircraft 100 may include one or more propulsors 136 located on an upper surface 128 of convergent aft centerbody 110 and/or aft of rear spar 108. Propulsor 136 may include any propulsors 136 as described in this disclosure. As used in this disclosure, a "propulsor" is a system or device configured to generate thrust in a fluid medium. For example, propulsor 136 may include a fan, propeller, rotor, and the like. In some cases, a propulsor 136 may include one or more components of an engine (e.g., jet engine) and a motor (e.g., electric motor). Propulsor 136 may include any propulsion system, propulsor 136, engine, or motor described in this disclosure. In one or more embodiments, propulsor 136 may include an engine fueled by more than one fuel. Alternatively or additionally, in some embodiments, propulsor 136 may include a motor powered by electricity. In some cases. electricity may be derived from fuel storage as described in this disclosure. For example, in some cases, electricity may be generated from one or more of a generator, alternator or the like. Alternatively or additionally, in some cases, electricity may be produced by a fuel cell. In some embodiments, propulsor 136 may include an electric motor. Electric motor may be powered by one or more electricity sources, such as without limitation batteries and/or fuel cells. Additional disclosure related to fuel cell technology may be found in U.S. patent application Ser. No. 17/478,724 title "BLENDED WING BODY AIRCRAFT WITH A FUEL CELL AND METHOD OF USE," filed on Sep. 17, 2021, and incorporated by reference, in its entirety, within this disclosure. In some cases, a fuel cell may provide steady state power to propulsor 136, such as for example, for cruise flight. Alternatively or additionally, a battery or another electricity source may provide supplemental power for climbing. In some cases, fuel cell may be configured to charge battery or another electricity source, when it produces excess power, for example during descent or ground operations. In one or more embodiments, propulsor 136 may include at least a propulsor 136 mechanically affixed to aircraft 100. In some cases, at least a propulsor 136 may be configured to propel aircraft 100 through a medium such as air. In some embodiments, at least a propulsor 136 may include at least an electric motor operatively connected with fuel cell. Alternatively or additionally, propulsor 136 may be powered by one or more batteries. Batteries may include any batteries described in this disclosure. Propulsor 136 may be operatively connected to fuel cell by way of electrical communication, for example through one or more conductors. In some cases, at least a fuel cell may be configured to power at least an electric motor of propulsor 136. In some embodiments, at least a propulsor 136 may include both a combustion engine and an electric motor. In some embodiments, at least a propulsor 136 may be attached to an upper aft surface of main body 104. In one or more embodiments, propulsor 136 may be located on or near an upper aft surface of convergent aft centerbody 110. In one or more embodiments, propulsor 136 may be situated directly above gear well 120. In one or more embodiments, at least one propulsor 136 directly above at least one gear well 120. In one or more embodiments, propulsor may be situated directly above gear well 120 wherein propulsor and gear well may be parallel about an axis. In one or more embodiments, gear well may include through hole 122 as described in this disclosure wherein propulsor 136 may pass through the through hole. In one or more embodiments, gear well may be large enough to allow for propulsor to pass through in instances wherein landing gear 132 is not situated within gear well 120. In one or more embodiments, propulsor 136 may be situated directly above gear well 120 wherein propulsor may be located at or near a first end of through hole and landing gear 132 may be situated at or near a second end of through hole. In one or more embodiments, a surface of gear well 120 may be structurally reinforced in comparison to other portions of convergent aft centerbody 110 wherein gear well may allow for increased structural rigidity of landing gear 132. In one or more embodiment, an engine support structure 140 as described below may be mechanically connected to gear well 120 or a surface of gear well. In one or more embodiments, propulsor may be situated directly above gear well, wherein propulsor 136 may pass through gear well 120 in instances where propulsor is mechanically disconnected from engine support structure 140. In one or more embodiments, placement of propulsor 136 and landing gear within a similar section of convergent aft centerbody 110 and/or within a similar plane may allow for increased aerodynamic efficiency. In one or more embodiments, at least one propulsor 136 is located over the at least one gear well 120 of the one or more gear wells 120.

In one or more embodiments, propulsor 136 may be connected to aircraft 100 through an engine support structure 140. In one or more embodiments, engine support structure 140 may provide for a mechanical connection of propulsor 136 to aircraft 100. In one or more embodiments, propulsor 136 may be connected to aircraft 100 by way of engine support structure 140. In some embodiments, engine support structure 140 may be mounted on top of fuselage or convergent aft centerbody 110. In one or more embodiments, engine support structure 140 may include a nacelle. In one or more embodiments, engine support structure 140 may be situated aft of rear spar 108 on an upper surface 128 of convergent aft centerbody 110. In one or more embodiments, engine support structure 140 may be situated aft of rear spar 108. In some embodiments, engine support structure 140 may be mounted to a top surface of fuselage and/or convergent aft centerbody 110. In some embodiments, engine support structure 140 may be mounted on top of the main body 104 of aircraft 100. An "engine support structure," as used herein, is a structure that connects a propulsor 136 with the main body 104 or frame of the aircraft 100. It may serve various purposes, like connecting the propulsor 136 with the fuselage and/or convergent aft centerbody 110 108, suppressing the vibrations of the propulsor 136 and distributing them safely to the whole aircraft 100 structure for a smooth flight. An engine support structure 140 may be a precision-based metal structure that is highly sturdy, as it has to balance the weight of the engine during different torque requirements. Engine support structure 140 may be constructed of any suitable material or combination of materials, including without limitation metal such as aluminum, titanium, or the like, polymer materials or composites, fiberglass, carbon fiber, or any other suitable material. As a non-limiting example, engine support structure 140 may be constructed from additively manufactured polymer material with a carbon fiber exterior; aluminum parts or other elements may be enclosed for structural strength, or for purposes of supporting, for instance, vibration, torque or shear stresses imposed by at least a propulsor 136. Engine support structure 140 may include a plurality of hoop structures 144, wherein each hoop structure 144 of the plurality of hoop structures 144 may include a horseshoe structure located forward of the center of gravity to the at least propulsor 136. Engine support structure 140 may include a plurality of hoop structures 144, wherein each hoop structure 144 of the plurality of hoop structures 144 may include a horseshoe structure located forward of the center of gravity of the at least an engine assembly. A "hoop structure," as used herein, is an engine support structure 140 that at least partially wraps around an engine of an aircraft 100. In some embodiments, a hoop structure 144 may include a horseshoe structure. A "horseshoe structure," as used herein, is an arc-shaped engine support structure 140. Propulsor 136 is configured to be top mounted to aircraft 100. For the purposes of this disclosure, a propulsor 136 and/or engine is "top mounted" when the engine is connected to an aircraft 100 through a connection on top of the engine. In one or more embodiments, engine support structure 140 and/or propulsor 136 may include one or more horseshoe structures wherein the horseshoe structures are configured to mount the one or more propulsors 136 on the BWB. In one or more embodiments, horseshoe structure may contain a predominantly horseshoe shape. In one or more embodiments, horseshoe structure may include a semicircular curve that wraps around propulsor 136 and rounded and/or curved ends at each end of the horseshoe structure. In one or more embodiments, the rounded and/or curved ends may allow for attachment of horseshoe structure on rear spear and/or aircraft 100. In one or more embodiments, additional propulsors 136 as described herein, may be mounted in way that support comes from the bottom of the engine support structure 140. In some embodiments, aircraft 100 may include one or more propulsors 136, such as a first and second propulsor 136 mounted or top mounted to aircraft 100. propulsor 136 may include a turbojet, turboprop, turbofan, ramjet, pulsejet, scramjet, electrical engine, and the like. In some embodiments, engines may be powered using fuel such as Jet A, Jet A1, Aviation gasoline (AVGAS), TS-1, Jet B, JP-8, JP-1, and the like.

With continued reference to FIG. 1, propulsor 136 and/or engine support structure 140 may be located on an upper surface of convergent aft centerbody 110. In one or more embodiments, propulsor 136 and/or horseshoe structure may be located on an opposed end of the one or more gear wells 120. In one or more embodiments, propulsor 136 and/or horseshoe structure may be located on opposing ends of convergent aft centerbody 110 wherein gear well 120 may be located on a lower surface 124 of convergent aft centerbody 110 and propulsor 136 may be located on an upper surface of convergent aft centerbody 110.

In one or more embodiments, propulsor 136, engine support structure 140 and and/or horseshoe structure may be located on an opposing upper surface 128 of convergent aft centerbody 110. In one or more embodiments, propulsor 136 may be located on top of gear well 120 wherein propulsor 136 may pass through gear well 120 in instances where gear well 120 includes a through hole 122 through convergent aft centerbody 110. In one or more embodiments, in instances wherein landing gear system and/or nose gear is extended, propulsor 136 may pass through gear well 120, or alternatively the through hole 122, and out of a lower surface 124 of convergent aft centerbody 110 and/or a lower surface of aircraft 100. In one or more embodiments, gear well 120 may allow for access to propulsor 136 and/or engine mount structure 104 through gear well 120. In one or more embodiments, through hole 122 may allow for removal of propulsor 136 from engine support structure 140 through gear well 120.

Still referring to FIG. 1, fuselage may include a plurality of ribs. In some embodiments, a rib may be the forming element of the structure of a wing. Ribs of aircraft 100 may include form-ribs, plate type ribs, closed-ribs, forged ribs, milled ribs, and the like. Ribs may be made of made out of wood, metal, plastic, composites, foam, and the like. Additionally, fuselage may include one or more spars. Spars may support flight loads and the weight of the wings while on the ground. Spars may be made of metal, wood, composite materials, and the like. Spars may run perpendicular to the ribs. A rib may be attached to a rear-most spar of the one or more spars. In one or more embodiments, rear spar 108 may be connected to and/or orthogonal to ribs. In one or more embodiments, ribs may be configured to contain a pressure vessel.

Still referring to FIG. 1, the plurality of hoop structures 144 of engine support structure 140 may resemble a horseshoe and may be used to provide a vertical engine mount for engines and/or propulsors 136 mounted atop a blended wing body aircraft 100. A "vertical engine mount," a used herein, is a device configured to vertically restrain the position of an engine. An engine mount may include a rubber body, sleeve bushing, a bonded plate, a connection bolt, and the like. An engine mount may be made of steel chrome molybdenum, chromoly tubular steel, and the like. An engine mount may include a conical engine mount, dynafocal engine mount, bed mount, and the like. This may be in contrast to banjos fittings that have been conventionally used. In some embodiments, aircraft 100 may include first engine support structure 140 attached to a first propulsor 136 and a second engine support structure 140 attached to a second propulsion as described above. In one or more embodiments, propulsor 136 may be consistent and/or include an engine.

With continued reference to FIG. 1, engine support structure 140 may include a beam 148. In some embodiments, beam 148 may be part of a horseshoe structure. In some embodiments, horseshoe structure may include a first half and a second half, wherein the first half and the second half are connected by beam 148. In some embodiments, top of propulsor 136 may be attached beam 148 of engine support structure 140. In some embodiments, propulsor 136 may be suspended from beam 148 engine support structure 140. In some embodiments, top of propulsor 136 may be attached to engine support structure 140. In some embodiments, propulsor 136 may be suspended from engine support structure 140. In some embodiments, engine support structure 140 may be mounted onto one or more wings of aircraft 100.

Still referring to FIG. 1, a plurality of hoop structures 144 may include two to three horseshoe structures; for example, with the left side of the horseshoe structures mounted to a first rib and the right side of the horseshoe structures mounted to a second rib. In an embodiments with two horseshoe structures, a first rib and second rib may be aft of and mounted to a rear spar 108, which may be used as a major structural element, and may allow for the addition of a thrust reverser to aircraft 100, as the design may provide a more open-ended structure. Each of the two horseshoe structures may be located forward of the center of gravity (CG) of proposal. Each of the two horseshoe structures may be located forward of the center of gravity (CG) of engine assembly. In an embodiment with three horseshoe structures, the third horseshoe structure may be located aft of the CG of the propulsor 136. In an embodiment with three horseshoe structures, the third horseshoe structure may be located aft of the CG of the engine assembly. Forward placement of the horseshoe structures relative to the CG of the engine and/or engine assembly may allow for a thrust reversal mechanism, also referred to as reverse thrust. "Thrust reversal," as used herein, is the temporary diversion of an aircraft 100 engine's thrust for it to act against the forward travel of the aircraft 100, providing deceleration. A thrust reversal mechanism may help slow down a jet aircraft 100 just after touch-down, reducing wear on the brakes and enabling shorter landing distances. Aircraft 100 may include target-type thrust reversal mechanism, wherein a pair of hydraulically operated bucket or clamshell type doors are used to reverse the hot gas stream. For forward thrust, these doors form the propelling nozzle of the engine. Aircraft 100 may include an internal thrust reversal mechanism, wherein deflector doors inside the engine shroud to redirect airflow through openings in the side of the nacelle. In a jet aircraft 100 embodiment, a thrust reversal mechanism may be accomplished by causing the jet blast to flow forward. In some embodiments, the engine does not run or rotate in reverse; instead, thrust reversing devices are used to block the blast and redirect it forward. Thrust reversing devices may include a bucket type reverser, clamshell door reverser cold, stream reverser cold stream, pivoting doors reverser, and the like.

With continued reference to FIG. 1, the plurality of hoop structures 144 may be coupled together by a shear support structure. A "shear support structure," for the purposes of this disclosure, is a structure that links one or more hoop structures 144 in shear. In some embodiments, shear support structure may be in the shape of a shell. In some embodiments, shear support structure may transmit engine thrust from one or more hoop structures 144 to the airframe. In some cases, it may be disadvantageous to provide openings in the shear support structure to permit the redirected airflow from a thrust reversal mechanism. Accordingly, in some embodiments, it is advantageous for hoop structures 144 and shear support structure to be located ahead of a thrust reversal mechanism. Accordingly, placement of two hoop structures 144 forward of an engine CG and/or engine assembly CG may allow for the inclusion of a thrust reversal mechanism. In some embodiments, use of two hoop structures 144 with the aft-most hoop structure 144 located lightly aft of the CG of the fan core of the engine. This may allow for the thrust reversal mechanism to be placed aft of the shear support structure.

With continued reference to FIG. 1, in one or more embodiments, outer mold line 112 of aircraft 100 may include an outer mold line skin. "Outer mold line skin" for the purposes of this disclosure refers to a material that encapsulates the aircraft or a portion of the aircraft. In one or more embodiments, a surface of outer mold line skin may include the outer mold line or a portion thereof. In one or more embodiments, outer mold line skin 1 may protect the aircraft from outside elements, such as but not limited to, rain, cold air, hot air and the like. In one or more embodiments, outer mold line skin may be used to contain pressure within the aircraft. In one or more embodiments, outer mold line skin may encapsulate an outer surface of aircraft 100. In one or more embodiments, outer mold line skin may include one or more materials suitable for flight. In one or more embodiments, outer mold line skin may include aluminum, an aluminum alloy and the like. In one or more embodiments, outer mold line skin may include a carbon fiber material. In one or more embodiments, rear spar, frames of rear spar 104, convergent aft centerbody 110, and/or any other structural components may contain carbon fiber material "Carbon fiber material" as described in this disclosure is a material including carbon fibers. The carbon fibers may be spooled into carbon strands. In some embodiments, carbon fiber material may include a composite material. A "composite material" as described in this disclosure refers to a material which is produced from two or more materials. For example, a composite material may include a plurality of carbon fiber strands that are permeated with plastic resin. In some embodiments, carbon fiber material may include a carbon fiber lamina. A "lamina" for the purposes of this disclosure is a thin layer of material. For example, a lamina may be a thin layer of the composite material mentioned above. In some embodiments, carbon fiber material may include a carbon fiber lamina, the carbon fiber lamina having a plurality of carbon fiber strands. Carbon fiber material may further include a carbon fiber composite lamina wherein the carbon fiber composite lamina includes a thin layer of the plurality of carbon fibers combined with a resin. In one or more embodiments, carbon fiber material may further include a composite laminate having a plurality of layers. In one or more embodiments, composite laminate includes one or more composite laminae stacked upon each other. The one or more composite laminae may be held together through the use of a binding agent, such as an epoxy, stitching, nails, glue or the like. The composite laminate may have a quasi-isotropic layup. A "quasi-isotropic layup" as described in this disclosure is when the orientation of the one or more composite lamina are balanced such that there is a constant strength and stiffness of the composite laminate regardless of the direction in which a force is applied. In some embodiments, carbon fiber material may include a composite laminate wherein each lamina contains the same or substantially similar material. In some embodiments, carbon fiber material may include a composite laminate wherein each lamina contains one or more different materials.

With continued reference to FIG. 1, carbon fiber material may include a stitched resin infused carbon cloth. As described in this disclosure, "stitched resin infused carbon cloth" is a fibrous material, such as carbon, embedded within a resin and stitched together. Stitched resin infused carbon cloth may include a composite laminate wherein the composite laminate is held together and reinforced with stitching. Stitched resin infused carbon fiber cloth may further include a composite having a single layer. "Resin" as described in this disclosure is a compound consisting of a non-crystalline or viscous liquid substance. Resin may be reacted with a curing agent or a hardener in order to create a solid material. In some embodiments, resin may include vinylester resins, epoxy resins or any other lightweight resins with durability suitable for aircraft. Stitched resin infused carbon cloth may include stitching wherein the stitching binds the one or more composite lamina of the composite laminate. Carbon fiber material may be stitched using a modified lock stitch, a lock stitch, a chain stitch or the like. In some embodiments, carbon fiber material may be stitched using material such as polyester, aramid or a thermoplastic. Stitched infused carbon fiber cloth may further include a plurality of layers, wherein each layer is a composite of carbon fibers and resin. In some embodiments, stitching provides delamination resistance and improves damage tolerance of a composite laminate. In some embodiments stitched infused carbon fiber cloth is lighter than aluminum with similar strength or tensile properties. In some embodiments, carbon fiber material may include a plurality of carbon strands that are orientated in a parallel direction. In some embodiments, carbon fiber material may include a plurality of carbon strands that are woven together such that the carbon strands interlace at right angles to one another. Stitched resin infused carbon fiber cloth may be a pliable material. Alternatively, stitched resin infused carbon fiber cloth may be a non-pliable material. In one or more embodiments, carbon fiber material may include any carbon fiber material as described in U.S. Nonprovisional patent application Ser. No. 18/117,145, filed on Mar. 3, 2023, and titled "AIRCRAFT WITH CARBON FIBER MATERIAL AND A METHOD OF MANUFACTURE" having the entirety of which is incorporated by reference herein.

In one or more embodiments, carbon fiber material may include one or more dry carbon fiber sheets. A "carbon fiber sheet" for the purposes of this disclosure is one or more layers of a carbon fiber material that are stacked upon each other. For example, carbon fiber sheet may include multiple layers wherein each layer includes carbon fiber strands, portions of carbon fiber strands, composites comprising carbon fiber strands and the like. In one or more embodiments, carbon fiber sheet may include one or more layers, wherein each layer may include a plurality of carbon fiber strands. In one or more embodiments, the one or more dry carbon fiber sheets may be stitched together. In one or more embodiments, each layer may include a thin sheet of carbon fiber material, bundles of carbon fibers, a sheet consisting of woven carbon fiber strands, a sheet carbon fiber strands bound together with an adhesive such as a glue, epoxy and/or stitching and any other variation of carbon fiber material. In one or more embodiments, carbon fiber material may include first dry carbon fiber sheet. First dry carbon fiber sheet may be consistent with carbon fiber sheet. The carbon fiber strands within first dry carbon fiber sheet may be spooled using carbon fibers. In one or more embodiments, each layer may include a composite material. In one or more embodiment, carbon fiber sheet may contain one or more layers, wherein each layer includes a plurality of carbon fibers. In one or more embodiments, each layer may include a plurality of dry carbon fibers. "Dry carbon fiber," for the purposes of this disclosure, is carbon fiber that has not been coated or impregnated with resin. In one or more embodiments, layers within carbon fiber sheet may contain differing materials, orientations and the like. For example, a top layer may contain a plurality of carbon fiber strands orientated in a first direction and a middle layer may contain a plurality of carbon fiber strands orientated in a differing second direction. In one or more embodiments, the top layer may include a composite material and/or a differing material as the middle layer. In one or more embodiments, carbon fiber sheet may include a quasi-isotropic layup. A "quasi-isotropic layup" as described in this disclosure is when the orientation of the one or more layers are balanced such that there is a constant strength and stiffness of the carbon fiber sheet regardless of the direction in which a force is applied. For example, carbon fiber sheet may include four layers oriented at angles of 0°/−45°/+45°/90°, wherein the orientation of angles provides for a similar strength in multiple directions.

With continued reference to FIG. 1, in one or more embodiments, first dry carbon fiber sheet may include a thickness. The thickness may be defined as a result of multiple layers stacked upon one another. For example, a thickness of a top layer and a thickness of a middle layer may provide for an overall thickness of first dry carbon fiber sheet. The first dry carbon fiber sheet may include multiple layers laid onto of one another wherein the combination of the multiple layers may result in a resulting overall thickness. For example, the first dry carbon fiber sheet may include 10 layers wherein each layer may include a thickness of 001 inches wherein the combination of layers may result in a carbon fiber sheet consisting of 010 inches. In one or more embodiments, layers within carbon fiber material may contain differing thicknesses. For example, a top layer may contain a thickness of 001 inches whereas a second layer may consist of 0.002 inches. In one or more embodiments, the resulting thickness of the first dry carbon fiber sheet 200 may include a resulting thickness of 007 inches and/or 2 millimeters. In one or more embodiments, the thickness of the first dry carbon fiber sheet may include an overall thickness ranging from 0.050 inches to 1 inch.

With continued reference to FIG. 1, the first dry carbon fiber sheet may include a first layer. The first layer may be consistent with any layer described in this disclosure. First layer may include a first plurality of dry carbon fibers positioned in a first direction. First plurality of dry carbon fibers may be consistent with any dry carbon fibers mentioned within this disclosure. In one or more embodiments, the first plurality of carbon fibers may include more than one carbon fiber strands oriented in a similar direction. For example a first strand within the first plurality of carbon fibers may be parallel to a second strand within first plurality of carbon fibers. In one or more embodiments, a first dry carbon fiber within first plurality of carbon fiber is situated non-parallel to a second dry carbon fiber of the first plurality of dry carbon fibers. In one or more embodiments, the first plurality of dry carbon fibers may be unidirectional wherein each fiber within the first plurality of carbon fibers are parallel to one another. "Unidirectional" for the purposes of this disclosure refers to a layer wherein each fiber within the layer run in a single parallel direction. In one or more embodiments, the first plurality of dry carbon fibers may be bidirectional. "Bidirectional" for the purposes of this disclosure refers to a layer wherein each fiber within the layer runs in either one of two directions. For example, one or more fibers within the first plurality of dry carbon fibers may be non-parallel to one or more fibers within first plurality of dry carbon fibers. In one or more embodiments, a first portion of dry carbon fibers within first plurality of dry carbon fibers may be orthogonal to a second portion of dry carbon fibers, wherein a portion is one or more dry carbon fiber. In one or more embodiments, first layer may include a woven material wherein a portion of dry carbon fibers within first plurality of dry carbon fibers may be interlaced as to form a fabric. In one or more embodiments, the portion of dry carbon fibers may be woven and/or interlaced orthogonally to a second portion of dry carbon fibers within first plurality of dry carbon fibers.

With continued reference to FIG. 1, the first dry carbon fiber sheet may include a second layer having a second plurality of dry carbon fibers positioned in a second direction. Second layer may be consistent with first layer. In one or more embodiments, the second layer may include a differing material in comparison to first layer, differing orientation of fibers in comparison to first layer, and the like. For example, the first plurality of dry carbon fibers may be bidirectional wherein second layer may be unidirectional. In one or more embodiments, the first layer may include a woven material whereas the second layer may contain a nonwoven material. In one or more embodiments, the second layer may contain a differing width, thickness, and length in comparison to the first layer. In one or more embodiments, a second plurality of dry carbon fibers may be oriented in a second direction wherein the second direction differs from the first direction. For example, the second plurality of dry carbon fibers may be oriented at a 90-degree angle whereas first plurality of dry carbon fibers may be oriented at a 0-degree angle. In one or more embodiments, first direction and second direction may be similar.

With continued reference to FIG. 1, second layer may be disposed on top of first layer. In one or more embodiments, second layer may be disposed on top of first layer such that a surface area of second layer is substantially in contact with first layer. In one or more embodiments, second layer may be disposed on top of first layer such that second layer is stacked upon first layer. In one or more embodiments, second layer may be stacked upon first layer such that the width of second layer and the width of first dry carbon fiber sheet may be substantially similar. In one or more embodiments, first layer, second layer and first dry carbon fiber sheet contain a substantially similar thickness. In one or more embodiments, a portion of second layer may be stacked upon a portion of first layer.

With continued reference to FIG. 1, first dry carbon fiber sheet and/or alternatively carbon fiber material may include more than two layers. For example, first carbon fibers sheet may include a third layer. In one or more embodiments, first dry carbon fiber sheet may include more than three layers. In one or more embodiments, first dry carbon fiber sheet may contain 10 or more layers wherein each layer may be consistent with first layer, second layer and any other layers described within this disclosure.

Figure 2:
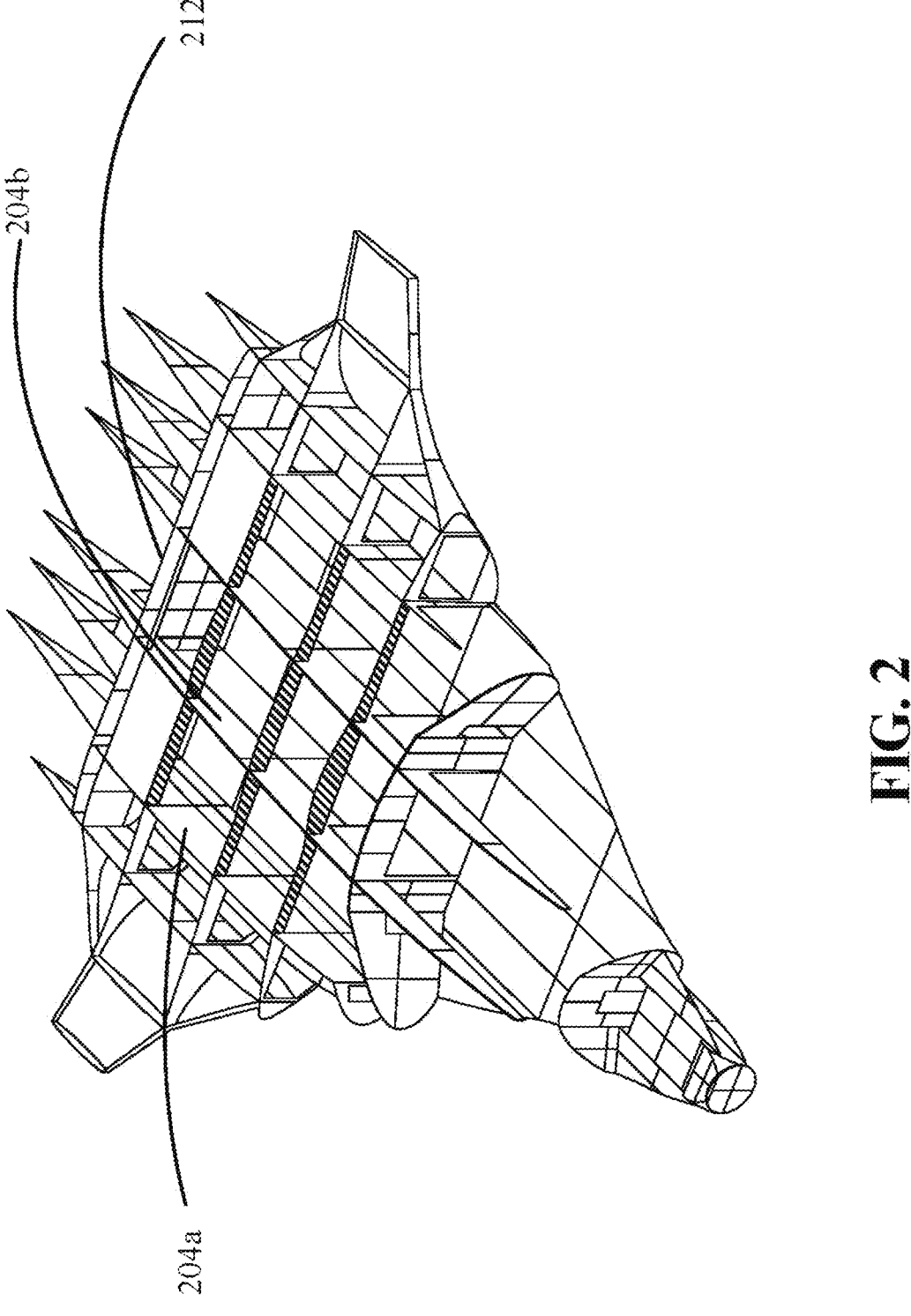
FIG. 2 is an illustration of exemplary embodiments of structural components of an aircraft.

Now referring to FIG. 2, an exemplary embodiment of an aircraft structure 200 is described. In one or more embodiments, aircraft structure 200 may be consistent with any aircraft as described in this disclosure. In one or more embodiments, aircraft structure 200 may include a structure of a fuselage of aircraft 100 wherein the fuselage includes the main body 104 and rear spar 212. In one or more embodiments, fuselage may include a plurality of ribs 204. As used herein, a "rib" is a structural member that runs longitudinally down a fuselage. In some embodiments, a rib may be the forming element of the structure of a wing. Ribs of aircraft may include form-ribs, plate type ribs, closed-ribs, forged ribs, milled ribs, and the like. Ribs may be made of made out of wood, metal, plastic, composites, foam, and the like. A plurality of ribs may include a first rib 204a and a second rib 204b. Additionally, fuselage may include one or more spars. A "spar," as used herein, is structural member of an aircraft that is transverse to longitudinal structural members. Spars may flight loads and the weight of the wings while on the ground. Spars may be made of metal, wood, composite materials, and the like. Spars may run perpendicular to the ribs. First rib 204a and second rib 204b may be attached to a rear-most spar of the one or more spars.

Still referring to FIG. 2, in some embodiments, engine may be mounted behind a pressure vessel of main body or on an aft portion of fuselage. As used herein, a "pressure vessel" is a closed container, compartment, storage, or vessel that is designed to withstand pressures higher or lower than the surrounding atmosphere. For example, at higher altitudes an interior of the main body of aircraft 100 may contain a large pressure difference in comparison to the atmospheric pressure such that the main body of aircraft 100 is a pressure vessel. In some embodiments, engines may be mounted to ribs of the aircraft attached to aft face of aft pressure bulkhead or rear spar 212; the opened ended structure may allow easer mounting of an engine. As used herein, "rear pressure bulkhead" and "aft pressure bulkhead" are used interchangeably to mean a rear pressure containing component of an airframe. In some embodiments, a rear pressure bulkhead may include the rearmost pressure sealing element of a pressure vessel. In some embodiments, rear pressure bulkhead may include a rear-most rib. In some embodiments, rear pressure bulkhead may include a rear-most frame. In some embodiments, the two outer most (laterally) spars may include pressure bulkheads configured to resist a pressure loading resulting from low ambient pressure and the like. In some embodiments, pressure vessel may include a passenger compartment. In one or more embodiments, aft pressure bulkhead may include a rear spar 212 as described above.

Figure 3:
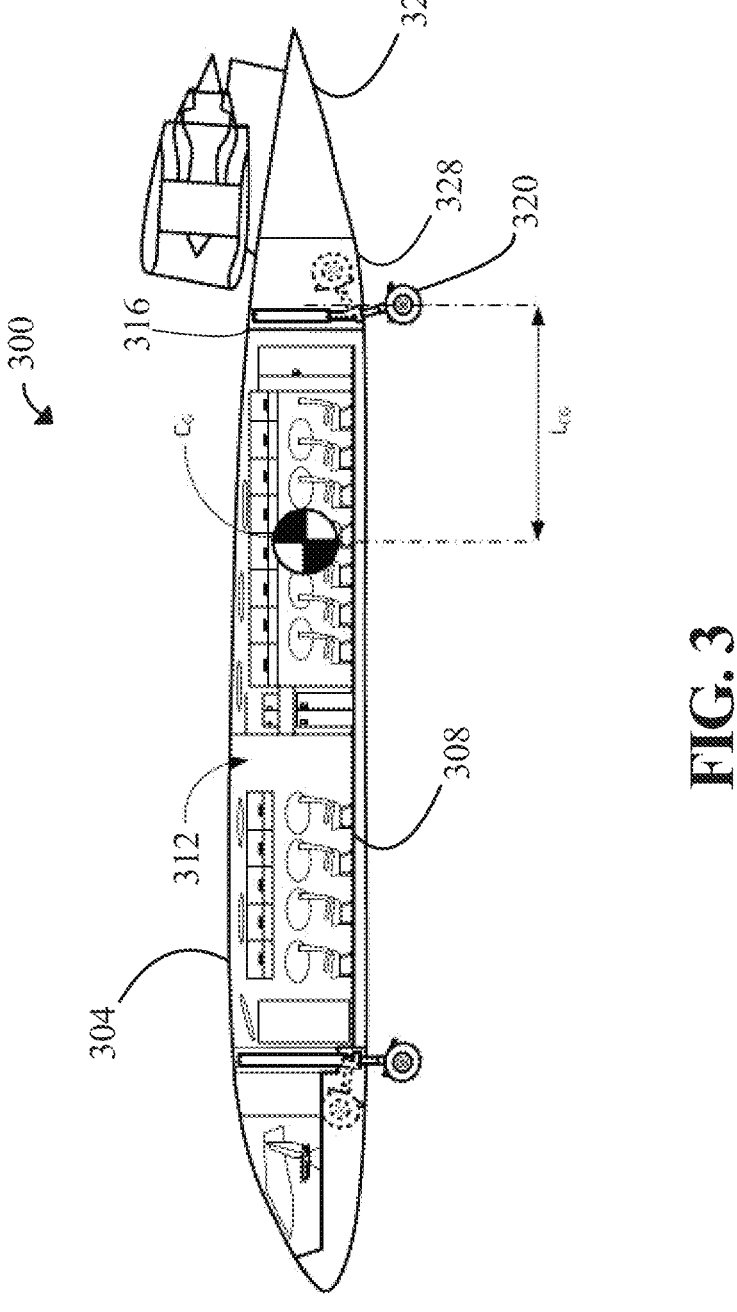
FIG. 3 is a side view illustration of an exemplary aircraft.

Referring now to FIG. 3, an exemplary aircraft 300 is illustrated in side-view. Aircraft 300 may include a blended wing body 304. Aircraft 300 may include a single deck 308. In some embodiments, blended wing body 304 and or fuselage, as described above, may include single deck 308. Single deck 308 may include a passenger compartment 312. In one or more embodiments, aircraft 300 may include a single deck wherein passengers and/or cargo are located on or above the single deck.

With continued reference to FIG. 3, as used in this disclosure, a "deck" on an aircraft is platform upon which one or more of passengers and cargo may be stored. A single deck 308 may be contrasted with a two-deck configuration analogously to a single-story house contrasted to a two-story house. In some cases, a single deck may have deviations in angle or height, just as a single-story house may have rooms in which one steps-up or steps-down in when entering. For example, in some cases, a single deck 308 may include multiple bays (e.g., 2 bays, 3 bays, 4 bays, 5 bays, and the like). Each of the multiple bays may have a floor which is not in plane with another bay. Furthermore, in some cases, a single deck 308 may not be entirely of a single plane or angle. For example, single deck 308 may have slight grade introduced in one or more portions. Slight grade in single deck 308 may match or parallel an outer mold line of aircraft. While a single deck 308 need not be comprised of a single plane, a single deck 308 may be characterized by its not having another deck directly above or below it. A plane coincident with single deck 308 may be conceptualized as a horizontal line, coincident with the single deck 308, extending across FIG. 3.

With continued reference to FIG. 3, a rear spar 316 may be located aft of the passenger compartment. In one or more embodiments, rear spar 316 may be located on or more above single deck 308. In one or more embodiments, a landing gear 320 may be extended outside of rear spar 316 during takeoff and landing. In one or more embodiments, landing gear 320 may be stowed within a boundary created by rear spear 316 during flight. In one or more embodiments, landing gear 320 may be stowed and/or retracted within a convergent aft centerbody 324 wherein landing gear 320 may be situated within a boundary created by an outer mold line of aircraft 300. In one or more embodiments, rear spar 316 may separate a passenger compartment of main body with convergent aft centerbody 324. In one or more embodiments, convergent aft centerbody may extend from rear spar to an aft of aircraft 300. In one or more embodiments, convergent aft centerbody may include a gear well 328. In one or more embodiments, gear well 328 may be located aft of rear spar. In one or more embodiments, gear well 328 may be situated near rear spar wherein rear spar may provide structure to gear well 328. In one or more embodiments, landing gear 320 may be stowed within gear well 328 during a flight. In one or more embodiments, landing gear and gear well may be situated aft or rear spar 316. In one or more embodiments, rear spar may separate the pressurized passenger cabin from an unpressurized convergent aft centerbody. In one or more embodiments, landing gear 320 and a propulsor may be located aft of rear spar 316 in order to protect passenger cabin from any malfunctions occurred by landing gear or the propulsor. In one or more embodiments, landing gear and/or propulsor may be located aft of rear spar 316 wherein malfunctioning of landing gear 320 and/or propulsor may allow for the pressure vessel to remain intact.

Figure 4:
FIG. 4 is a forward, port and top view of an exemplary blended wing body aircraft and an exemplary engine burst pattern.

Now referring to FIG. 4, an exemplary embodiment of aircraft 400 and an engine burst pattern are disclosed. Aircraft 400 may include pressure vessel 404, which may include rear pressure bulkhead 408. Aircraft 400 may also include fuel store 412, which may be in a transition region between main body of aircraft 400 and wing 416. Aircraft 400 may also include first engine 420a. Aircraft 400 may also include second engine 420b. In some embodiments, first engine 420a and/or second engine 420b may be positioned aft of rear pressure bulkhead 408, aft of fuel store 412 and/or above fuel store 412. Such positioning may cause the most high risk parts of burst pattern 424 not to include pressure vessel 404 and/or fuel store 412.

Still referring to FIG. 4, in some embodiments, a burst pattern may be described or approximated as a plane extending from engines in lateral and vertical directions. In some embodiments, a burst pattern may be described or approximated as the region outside of a right circular cone, with the vertex of the cone positioned at an engine and the center of the base of the cone forward of the vertex of the cone, and where the angle between the outside of the cone and the altitude line is about 70, 75, 80, or 85 degrees. An apex of a conical burst pattern may be positioned for example at front, back or midpoint of engine or at the location of fan blades. In some embodiments, aircraft components may be positioned in order to account for multiple burst patterns which may account for multiple engines. Pressure vessel, fuel stores, and engines may be positioned such that pressure vessel and/or fuel stores avoid all or any subset of burst patterns.

Still referring to FIG. 4, in some embodiments, a burst pattern may include regions of relatively high, moderate, and low risk. In some embodiments, positions aft of or lateral to engines and/or turbines are relatively high risk. In some embodiments, positions outside of a conical exclusion from burst pattern (as described above) but not aft of or lateral to engines are moderate risk. In some embodiments, positions in a conical exclusion from a burst pattern as described above are relatively low risk. In some embodiments, a pressure vessel may be in a low and/or moderate risk zone of a burst pattern. In some embodiments, 10%, 20%, 30%, 40%, 50%, 60%, 70%, 80%, 90%, or 100% of a pressure vessel is in a low and/or moderate risk zone of a burst pattern. In some embodiments, a fuel store may be in a low and/or moderate risk zone of a burst pattern. In some embodiments, 10%, 20%, 30%, 40%, 50%, 60%, 70%, 80%, 90%, or 100% of a fuel store is in a low and/or moderate risk zone of a burst pattern. In some embodiments, 10%, 20%, 30%, 40%, 50%, 60%, 70%, 80%, 90%, or 100% of fuel is stored in fuel stores in a low and/or moderate risk zone of a burst pattern. In some embodiments, a bottom of a fuel store is in a low and/or moderate risk zone of a burst pattern.

Figure 5:
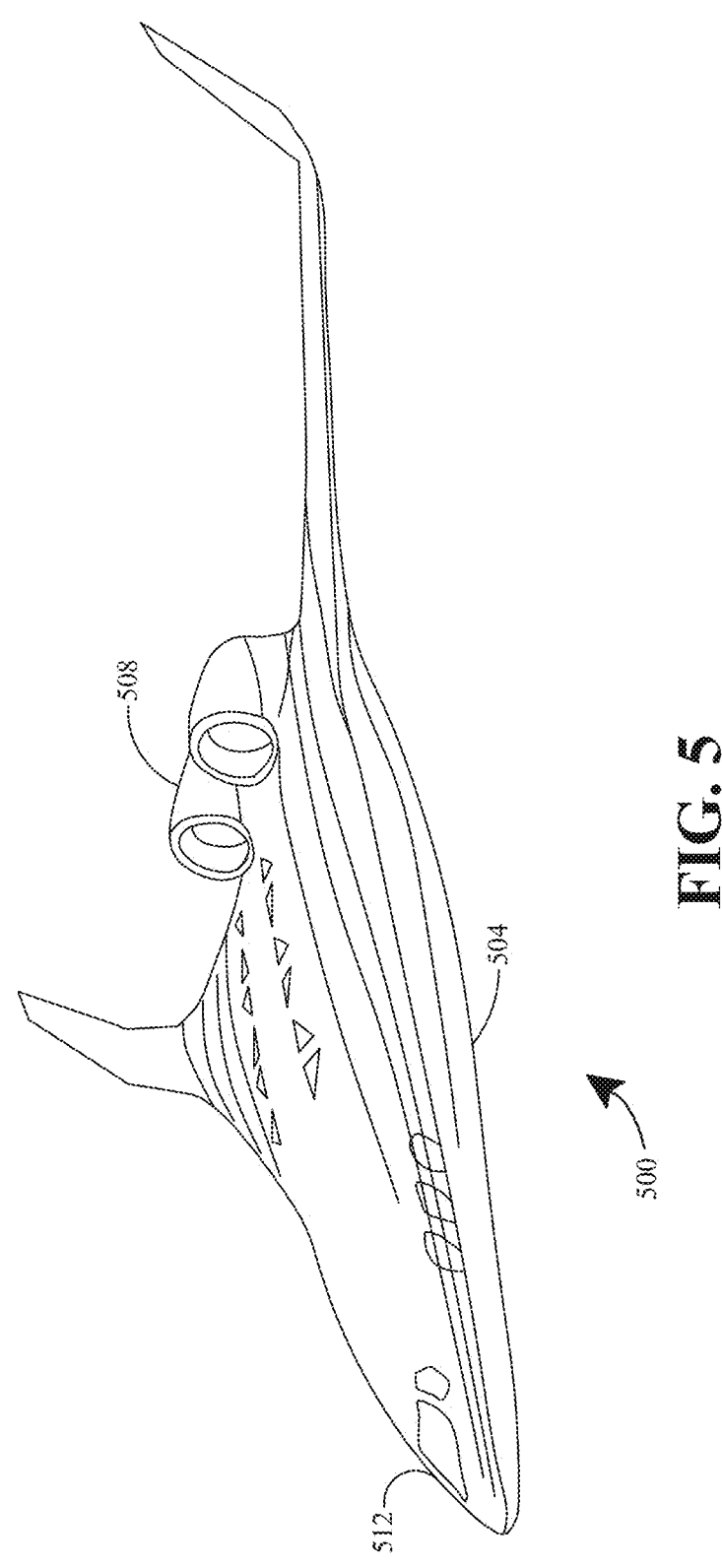
FIG. 5 is a schematic of an exemplary blended wing body aircraft.

Referring to FIG. 5, an exemplary blended wing aircraft 500 is illustrated. Aircraft 500 may include a blended wing body 504. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 504 aircraft may have distinct wing and body structures, which are smoothly blended together with no clear dividing line or boundary feature between wing and fuselage. This contrasts with a flying wing, which has no distinct fuselage, and a lifting body, which has no distinct wings. In some embodiments, a BWB 504 may have no clear or abrupt demarcation between wings and a main body of the aircraft along a trailing edge of the aircraft. A BWB 504 design may or may not be tailless. One potential advantage of a BWB 504 may be to reduce wetted area and any accompanying drag associated with a conventional wing-body junction. In some cases, a BWB 504 may also have a wide airfoil-shaped body, allowing entire aircraft to generate lift and thereby facilitate reduction in size and/or drag of wings. In some cases, a BWB 504 may be understood as a hybrid shape that resembles a flying wing, but also incorporates features from conventional aircraft. In some cases, this combination may offer several advantages over conventional tube-and-wing airframes. In some cases, a BWB airframe 504 may help to increase fuel economy and create larger payload (cargo or passenger) volumes within the BWB. BWB 504 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 5, BWB 504 of aircraft 500 may include a nose portion. A "nose portion," for the purposes of this disclosure, refers to any portion of aircraft 500 forward of the aircraft's fuselage 512. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 5, BWB 504 may include at least a structural component of aircraft 500. Structural components may provide physical stability during an entirety of an aircraft's 500 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 500 structure, they may be so named A, B, C, and so on named from nose to tail. Pillars, like any structural element, may be disposed a distance away from each other, along an exterior of aircraft 500 and BWB 504. Depending on manufacturing method of BWB 504, pillars may be integral to frame and skin, comprised entirely of internal framing, or alternatively, may be only integral to structural skin elements. Structural skin will be discussed in greater detail below.

With continued reference to FIG. 5, BWB 504 may include a plurality of materials, alone or in combination, in its construction. At least a BWB 504, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 504 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 504 may additionally or alternatively use wood or another suitably strong yet light material for an internal structure.

With continued reference to FIG. 5, aircraft 500 may include monocoque or semi-monocoque construction. BWB 504 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 5, BWB 504 may include at least a fuselage. A "fuselage," for the purposes of this disclosure, refers to a main body of an aircraft 500, or in other words, an entirety of the aircraft 500 except for nose, wings, empennage, nacelles, and control surfaces. In some cases, fuselage may contains an aircraft's payload. At least a fuselage may comprise structural components that physically support a shape and structure of an aircraft 500. Structural components may take a plurality of forms, alone or in combination with other types. Structural components vary depending on construction type of aircraft 500 and specifically, fuselage. A fuselage 512 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 5, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 500. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 100 when installed. In other words, former (s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 5, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 5, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which are may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 5, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 5, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 5, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 504. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 5, a fuselage may include an interior cavity. An interior cavity may include a volumetric space configurable to house passenger seats and/or cargo. An interior cavity may be configured to include receptacles for fuel stores, batteries, fuel cells, or other energy sources as described herein. In some cases, a post may be supporting a floor (i.e., deck), or in other words a surface on which a passenger, operator, passenger, payload, or other object would rest on due to gravity when within an aircraft 500 is in its level flight orientation or sitting on ground. A post may act similarly to stringer in that it is configured to support axial loads in compression due to a load being applied parallel to its axis due to, for example, a heavy object being placed on a floor of aircraft 500. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 5, aircraft 500 may include at least a flight component 508. A flight component 508 may be consistent with any description of a flight component described in this disclosure, such as without limitation propulsors, control surfaces, rotors, engines, propellers, wings, winglets, or the like. For the purposes of this disclosure, at least a "flight component" is at least one element of an aircraft 500 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 500. In some embodiments, at least a flight component 508 may include a propulsor, for example a rotor attached to an electric motor configured to produce shaft torque and in turn, create thrust. As used in this disclosure, an "electric motor" is an electrical machine that converts electric energy into mechanical work.

Still referring to FIG. 5, in some embodiments, a flight component may include an engine. As used herein, an "engine" is a machine designed to convert one or more non-mechanical forms of energy into mechanical energy. Engine may include an engine assembly. An "engine assembly," as used herein, is a mechanical assembly including all of the constituent parts of an engine. Engine assembly may include, as non-limiting examples, a fan, gearbox such as a reduction gearbox, an engine core, and/or the like. An engine may include embodiments as described in U.S. Non-provisional application Ser. No. 17/501,492 filed on Oct. 14, 2021, and entitled "DRAG RECOVERY SCHEME USING BOUNDARY LAYER INGESTION," and U.S. Non-provisional application Ser. No. 18/102,342 filed on Jan. 27, 2023, and entitled "APPARATUS FOR INGESTING BOUNDARY LAYER FLOW FOR AN AIRCRAFT," the entirety of both of which are incorporated herein by reference. In some embodiments, an engine may include a turbine. As used herein, a "turbine" is a machine which propels an aircraft through use of a rotor affixed to one or more vanes. In some embodiments, an engine, such as a turbine, may be configured to propel aircraft 500 forward while aircraft 500 is airborne.

Still referring to FIG. 5, in some embodiments, an engine may be positioned in order to avoid damage to other critical components of aircraft 500 in the event of engine failure. In some embodiments, engine may be positioned towards the rear of aircraft 500. In some embodiments, engine may be positioned on top of main body of aircraft 500. In some embodiments, aircraft 500 may include multiple engines, each of which is positioned towards rear of aircraft 500 and/or on top of main body of aircraft 500.

Still referring to FIG. 5, in some embodiments, engine may be mounted aft of rear spar and/or rear pressure bulkhead. In some embodiments, such positioning may result in reduced likelihood that engine failure results in puncture of the pressure vessel. In some embodiments, fuel stores may be located forward of and/or below engine. In some embodiments, such positioning may allow fuel store to avoid debris from engine failure. In some embodiments, such positioning may leave only top of fuel store within a potential debris field. This may limit fuel loss by reducing the likelihood that debris punctures bottom of fuel store which may create a leak. In some embodiments, aircraft 500 may include a plurality of fuel stores such that damage to a single fuel store may not compromise fuel in other fuel stores. In some embodiments, a turbine may be placed using the same considerations laid out herein with respect to engine placement. This may limit the likelihood of, for example, a turbine blade from piercing pressure vessel upon turbine failure.

Still referring to FIG. 5, as used herein, a "lateral" direction of an aircraft is a direction running in a straight line from wing tip to wing tip. Lateral direction may be orthogonal to longitudinal direction. As used herein, a "longitudinal" direction of an aircraft is a direction running in a straight line from nose to tail of the aircraft. As used herein, "fore" and "forward" are used interchangeably to mean a direction from an aircraft tail to an aircraft nose along a longitudinal axis. As used herein, "aft" and "rear" are used interchangeably to mean a direction from an aircraft nose to an aircraft tail along a longitudinal axis.

Still referring to FIG. 5, where it is said that a first component is in a direction of a second component herein, this means that the first component is located in that direction of a plane perpendicular to a line in the specified direction. Unless specified otherwise, where it is said that a first component is in a direction of a second component herein, this means that the entirety of the first component is in the specified direction relative to the entirety of the second component. For example, if it is said that an engine is above a fuel store, then, unless specified otherwise, the entirety of the engine is above the entirety of the fuel store along a vertical axis, but this does not mean or imply any relationship between the engine or the fuel store along a horizontal axis.

Still referring to FIG. 5, where a first component is not completely in a direction of another (i.e., where there is overlap in their ranges on the relevant axis), the degree to which a component is in a direction of another is measured by, unless specified otherwise, volume. For example, if 50% of an engine is said to be aft of 70% of a pressure vessel, then, unless specified otherwise, that means 50% of the volume of the engine is aft of 70% of the volume of the pressure vessel.

Still referring to FIG. 5, in some embodiments, engine may be positioned aft of rear pressure bulkhead. In some embodiments, at least 10%, 20%, 30%, 40%, 50%, 60%, 70%, 80%, 90%, or 100% of engine may be positioned aft of rear pressure bulkhead. In some embodiments, the entirety of each engine of aircraft 100 may be positioned aft of rear pressure bulkhead. In some embodiments, at least 10%, 20%, 30%, 40%, 50%, 60%, 70%, 80%, 90%, or 100% of each engine of aircraft 100 may be positioned aft of rear pressure bulkhead.

Still referring to FIG. 5, in some embodiments, engine may be positioned aft of pressure vessel. In some embodiments, at least 10%, 20%, 30%, 40%, 50%, 60%, 70%, 80%, 90%, or 100% of engine may be positioned aft of pressure vessel. In some embodiments, the entirety of each engine of aircraft 500 may be positioned aft of pressure vessel. In some embodiments, at least 10%, 20%, 30%, 40%, 50%, 60%, 70%, 80%, 90%, or 100% of each engine of aircraft 100 may be positioned aft of pressure vessel. In some embodiments, at least 10%, 20%, 30%, 40%, 50%, 60%, 70%, 80%, 90%, or 100% of engine may be positioned aft of at least 10%, 20%, 30%, 40%, 50%, 60%, 70%, 80%, 90%, or 100% of pressure vessel.

Still referring to FIG. 5, in some embodiments, engine may be positioned aft of rear spar. In some embodiments, at least 10%, 20%, 30%, 40%, 50%, 60%, 70%, 80%, 90%, or 100% of engine may be positioned aft of rear spar. In some embodiments, the entirety of each engine of aircraft 500 may be positioned aft of rear spar. In some embodiments, at least 10%, 20%, 30%, 40%, 50%, 60%, 70%, 80%, 90%, or 100% of each engine of aircraft 100 may be positioned aft of rear spar.

Still referring to FIG. 5, in some embodiments, engine may be positioned aft of fuel store. In some embodiments, at least 10%, 20%, 30%, 40%, 50%, 60%, 70%, 80%, 90%, or 100% of engine may be positioned aft of fuel store. In some embodiments, the entirety of each engine of aircraft 500 may be positioned aft of fuel store. In some embodiments, at least 10%, 20%, 30%, 40%, 50%, 60%, 70%, 80%, 90%, or 100% of each engine of aircraft 500 may be positioned aft of fuel store. In some embodiments, at least 10%, 20%, 30%, 40%, 50%, 60%, 70%, 80%, 90%, or 100% of engine may be positioned aft of at least 10%, 20%, 30%, 40%, 50%, 60%, 70%, 80%, 90%, or 100% of fuel store. In some embodiments, at least 10%, 20%, 30%, 40%, 50%, 60%, 70%, 80%, 90%, or 100% of fuel is stored aft of engine.

Still referring to FIG. 5, in some embodiments, engine may be positioned above fuel store. In some embodiments, at least 10%, 20%, 30%, 40%, 50%, 60%, 70%, 80%, 90%, or 100% of engine may be positioned above fuel store. In some embodiments, the entirety of each engine of aircraft 500 may be positioned above fuel store. In some embodiments, at least 10%, 20%, 30%, 40%, 50%, 60%, 70%, 80%, 90%, or 100% of each engine of aircraft 100 may be positioned above fuel store. In some embodiments, at least 10%, 20%, 30%, 40%, 50%, 60%, 70%, 80%, 90%, or 100% of engine may be positioned above at least 10%, 20%, 30%, 40%, 50%, 60%, 70%, 80%, 90%, or 100% of fuel store. In some embodiments, at least 10%, 20%, 30%, 40%, 50%, 60%, 70%, 80%, 90%, or 100% of fuel is stored below engine.

With continued reference to FIG. 5, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 5, at least a flight component may be one or more devices configured to affect aircraft's 500 attitude. "Attitude", for the purposes of this disclosure, is the relative orientation of a body, in this case aircraft 500, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 500. A plurality of attitude datums may indicate one or more measurements relative to an aircraft's pitch, roll, yaw, or throttle compared to a relative starting point. One or more sensors may measure or detect an aircraft's 500 attitude and establish one or more attitude datums. An "attitude datum", for the purposes of this disclosure, refers to at least an element of data identifying an attitude of an aircraft 500.

With continued reference to FIG. 5, in some cases, aircraft 500 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 5, in some cases, aircraft 500 may include at least a pilot control. As used in this disclosure, a "pilot control," is an interface device that allows an operator, human or machine, to control a flight component of an aircraft. Pilot control may be communicatively connected to any other component presented in aircraft 500, the communicative connection may include redundant connections configured to safeguard against single-point failure. In some cases, a plurality of attitude datums may indicate a pilot's instruction to change heading and/or trim of an aircraft 500. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 100. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 508 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may determine as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 5, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 508. At least a flight component 508 may include any propulsor as described herein. In embodiment, at least a flight component 508 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 5, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 5, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 5, at least a flight component 508 may include wings, empennages, nacelles, control surfaces, fuselages, and landing gear, among others, to name a few. In embodiments, an empennage may be disposed at the aftmost point of an aircraft body 504. Empennage may comprise a tail of aircraft 500, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 500 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 500 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 504 aircraft 500 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 508 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

With continued reference to FIG. 5, in some cases, flight component 508 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 500. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

With continued reference to FIG. 5, wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 500 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 5, aircraft 500 may include an energy source. Energy source may include any device providing energy to at least a flight component 508, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 5, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 504 of aircraft 500, for example without limitation within a wing portion 512 of blended wing body 508. Aviation fuels may include petroleum-based fuels, or petroleum and synthetic fuel blends, used to power aircraft 500. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 500. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

Still referring to FIG. 5, in some embodiments, aircraft 500 may include a fuel store and fuel store may be positioned in a transition portion of blended wing body between the main body and a wing. In some embodiments, a first fuel store is positioned in a transition portion of blended wing body between main body and port wing, and a second fuel store is positioned in a transition portion of blended wing body between main body and starboard wing.

With continued reference to FIG. 5, modular aircraft 500 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 5, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

With continued reference to FIG. 5, fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 5, fuel cell may necessitate storage of fuel, such as liquified gas.

With continued reference to FIG. 5, aircraft 500 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 5, aircraft 500 may include multiple flight component 508 sub-systems, each of which may have a separate energy source. For instance, and without limitation, one or more flight components 508 may have a dedicated energy source. Alternatively, or additionally, a plurality of energy sources may each provide power to two or more flight components 508, such as, without limitation, a "fore" energy source providing power to flight components located toward a front of an aircraft 500, while an "aft" energy source provides power to flight components located toward a rear of the aircraft 500. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 508. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 5, aircraft 500 may include a flight component 508 that includes at least a nacelle 508. For the purposes of this disclosure, a "nacelle" is a streamlined body housing, which is sized according to that which it houses, such as without limitation an engine, a fuel store, or a flight component. When attached by a pylon entirely outside an airframe a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 500 partially or wholly enveloped by an outer mold line of the aircraft 500. At least a nacelle may be designed to be streamlined. At least a nacelle may be asymmetrical about a plane comprising the longitudinal axis of the engine and the yaw axis of modular aircraft 500.

With continued reference to FIG. 5, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 5, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 5, in nonlimiting embodiments, at least a flight component 508 may include an airbreathing engine such as a jet engine, turbojet engine, turboshaft engine, ramjet engine, scramjet engine, hybrid propulsion system, turbofan engine, or the like. At least a flight component 508 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 5, an aircraft 500 may include a flight controller. As used in this disclosure, a "flight controller" is a device that generates signals for controlling at least a flight component 508 of an aircraft 500. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 5, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system and/or computing device.

With continued reference to FIG. 5, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 5, in some embodiments, aircraft 500 may include landing gear such as tilting landing gear and/or cabin stowed landing gear. Landing gear may be consistent with any landing gear disclosed in U.S. patent application Ser. No. 17/868,483, filed on Jul. 19, 2022, and titled "TILTING LANDING GEAR SYSTEMS AND METHODS," U.S. patent application Ser. No. 16/730,508, filed on Dec. 30, 2019, and titled "SWING-ARM PIVOT PISTON LANDING GEAR SYSTEMS AND METHODS," U.S. patent application Ser. No. 17/873,865, filed on Jul. 26, 2022, and titled "TILTING LANDING GEAR SYSTEMS AND METHODS," U.S. patent application Ser. No. 17/958, 724, filed on Oct. 3, 2022, and titled "AN AIRCRAFT WITH CABIN-STOWED LANDING GEAR," the entirety of each of which is hereby incorporated by reference.

Figure 6:
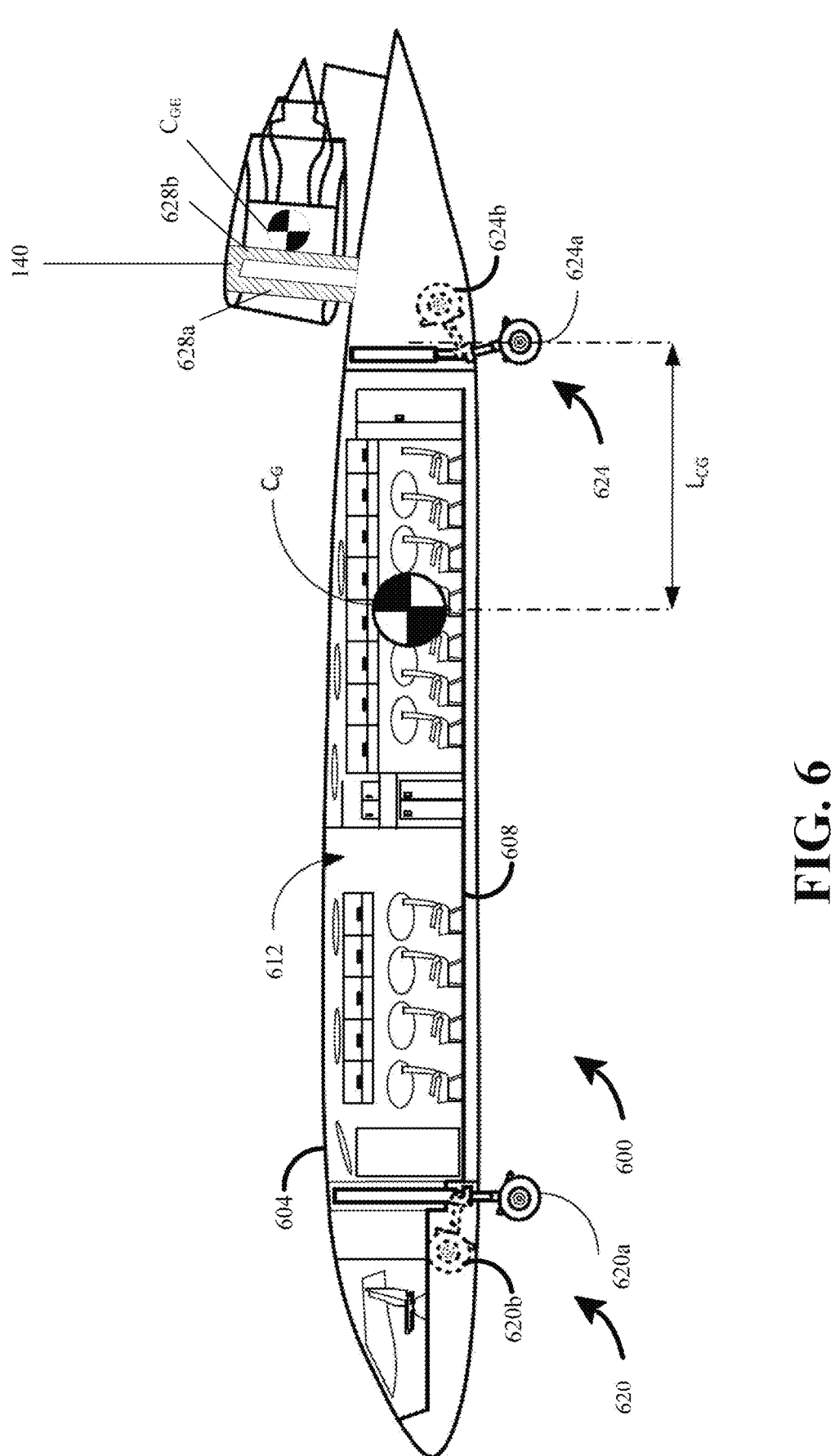
FIG. 6 is a side view illustration of an exemplary aircraft.

Referring now to FIG. 6, an exemplary aircraft 600 is illustrated in side-view. Aircraft 600 may include a blended wing body 604. Aircraft 600 may include a single deck 608. In some embodiments, blended wing body 604 and or fuselage, as described above, may include single deck 608. Single deck 608 may include a passenger compartment 612. As can be seen in FIG. 6, in some cases, nose gear 620 may be located substantially forward of single deck 608; and/or main gear 624 may be location substantially aft of the single deck 608. In some cases, passenger compartment 612 may be located substantially between nose gear 620 and main gear 624. FIG. 6 shows nose gear 620 in an extended position 620*a* as well as a retracted position 620*b*. FIG. 6 also shows main gear 624 in an extended position 624*a* as well as a retracted position 624*b*. As described above, in some cases, when retracted, one or more of nose gear 620 and main gear 624 may be located within a gear housing.

With continued reference to FIG. 6, as used in this disclosure, a "deck" on an aircraft is platform upon which one or more of passengers and cargo may be stored. A single deck 608 may be contrasted with a two-deck configuration analogously to a single-story house contrasted to a two-story house. In some cases, a single deck may have deviations in angle or height, just as a single-story house may have rooms in which one steps-up or steps-down in when entering. For example, in some cases, a single deck 608 may include multiple bays (e.g., 2 bays, 3 bays, 4 bays, 5 bays, and the like). Each of the multiple bays may have a floor which is not in plane with another bay. Furthermore, in some cases, a single deck 608 may not be entirely of a single plane or angle. For example, single deck 608 may have slight grade introduced in one or more portions. Slight grade in single deck 608 may match or parallel an outer mold line of aircraft. While a single deck 608 need not be comprised of a single plane, a single deck 608 may be characterized by its not having another deck directly above or below it.

Continuing with reference to FIG. 6, a plane coincident with single deck 608 may be conceptualized as a horizontal line, coincident with the single deck 608, extending across FIG. 6. In some embodiments, one or more of nose gear 620, main gear 624, and gear housing may be located within a position that intersects or otherwise overlaps with plane coincident with single deck 608. Said another way, in some cases, at least a portion of one or more of nose gear 620*a-b*, main gear 624*a-b*, and gear housing may be at substantially a same height as single deck 608.

With continued reference to FIG. 6, aircraft 600 may include engine support structure 140. In some embodiments, engine support structure may include a first hoop structure 628*a* and a second hoop structure 628*b*. First hoop structure 628*a* and second hoop structure 628*b* may be consistent with plurality of hoop structures described above. In some embodiments, where plurality of hoop structures includes two hoop structures, as described above, the two hoop structures may include first hoop structure 628*a* and second hoop structure 628*b*. First hoop structure 628*a* and second hoop structure 628*b* may be located forward of a center of gravity of an engine assembly. Center of gravity of an engine assembly is labeled using $C_{GE}$ in FIG. 6. Location of $C_{GE}$ in FIG. 6 is merely exemplary and would depend on the precise design of the engine. In some embodiments, engine may be located aft of rear spar. Engine being located aft of rear spar may mean that every part of engine is located aft of a vertical plane extending from the aft most portion of rear spar.

With continued reference to FIG. 6, further disclosure regarding, aircraft 600, single deck 608, passenger compartment 612, nose gear 620, main gear 624, and the like, may be found in U.S. Nonprovisional application Ser. No. 17/478,683, filed on Sep. 17, 2021, and entitled "AIRCRAFT FOR COMMERCIAL AIR TRAVEL AND A METHOD OF MANUFACTURE," and U.S. Nonprovisional application Ser. No. 17/895,384, filed on Aug. 25, 2022, and entitled "AIRCRAFT FOR COMMERCIAL AIR TRAVEL AND A METHOD OF MANUFACTURE," each of which are incorporated herein by reference.

Figures 7A, 7B:
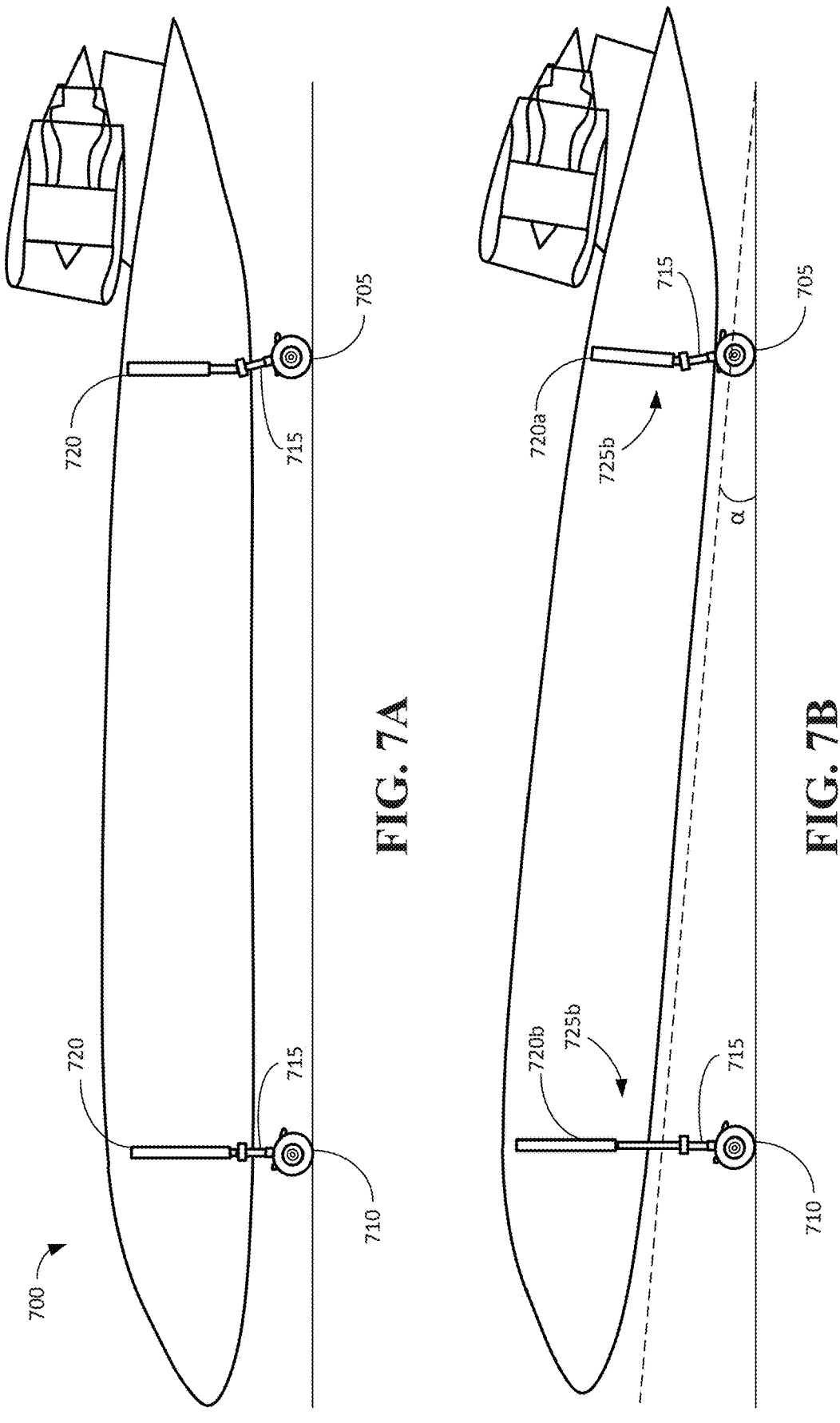
FIGS. 7A-7B are side views depicting a blended-wing aircraft with a direct hydraulic tilting landing gear system in the level, or ground position and in an angle of attack (AOA) position, in accordance with some examples of the present disclosure.

Referring now to FIG. 7A-7B, a side view of a blended wing aircraft with a landing gear system is illustrated. Landing gear system 700 may include a main gear 705 that can squat and/or a nose gear 710 that can extend to mechanically provide the desired angle-of-attack (AOA or a) for takeoff and/or landing. In some examples, landing gear system 700 can comprise two or more main gears 705*a* and one or more nose gear 710. In some cases, landing gear system 700 may include standard oleo struts 715 (e.g., airfoil pneumatic struts) mounted on one or more actuators 720. In some embodiments, the actuators 720 can be cylinders that are hydraulically or pneumatically linked, such that when one hydraulic cylinder 720 collapses the other hydraulic cylinder 720 extends, and vice versa. In some embodiments, the hydraulic cylinder 720 can be independently controlled to work in concert. In a preferred embodiment, the hydraulic cylinder 720 can comprise hydraulic cylinders that are also hydraulically linked.

As shown in FIG. 7A, therefore, in the level, or ground, configuration, the aircraft can be substantially level. In this configuration, the hydraulic cylinders 720 can be positioned such that the oleo struts 715 suspend the aircraft at a substantially level attitude with respect to the ground. This can enable passengers and cargo to be loaded onto the aircraft in the conventional manner. This can also enable the aircraft to be taxied for takeoff without unnecessarily affecting the pilot's view of the ground or adversely affecting ground handling. In other examples, the aircraft can have a slightly nose heavy configuration, for example, when the aircraft is on the ground, the nose hydraulic cylinder 720*b* is fully retracted and the main hydraulic cylinder 720*a* is fully extended. As discussed below, in some examples, for safety purposes, the hydraulic cylinders 720 can be locked in the level position anytime the aircraft is on the ground and below a predetermined speed unless otherwise overridden— e.g., for maintenance purposes.

As shown in FIG. 7B, however, to enable the aircraft to rotate for takeoff or landing, the main hydraulic cylinder 720*a* can collapse and the nose hydraulic cylinder 720*b* can extend to provide the desired AOA. In this configuration, as with conventional landing gear, the oleo struts 715 react to impacts and undulations on the ground, but these motions are measured in inches, quite small relative to the stroke needed for the tilting system. As the hydraulic cylinders collapse and extend, however, the overall height of the strut/cylinder assembly 725 changes. Thus, as the main hydraulic cylinder(s) 720*a* (i.e., two or more main hydraulic cylinder 720*a* for the two or more main gears 705*a*) retracts, the rear strut/cylinder assembly 725*a* squats. Conversely, as the nose hydraulic cylinder 720*b* (i.e., the cylinder for the nose gear 710) extends, the nose strut/cylinder assembly 725*b* extends. This has the effect of lowering the rear of the aircraft and raising the front of the aircraft to simulate takeoff rotation and/or landing flare.

Notably, however, this attitude is achieved with the landing gear 705, 710 still on the ground. In addition, as discussed below, the location and size of the hydraulic cylinders 720 can be such that they are essentially in equilibrium about the CG. In this manner, the system 700 can rotate the aircraft with very little force provided by the aerodynamic surfaces of the wing. This (1) overcomes the aforementioned issues related to overcoming a large LMG and (2) does so with the wing in a more aerodynamically efficient configuration. Because rotation requires much less negative lift and thus, deflection of the elevons 110 (or elevons in a tailless configuration) and/or flaps 115, the wing is also in a "cleaner" aerodynamic configuration (at least initially). In other words, significantly less negative lift is required at the back of the wing to generate the rotation moment, enabling the wing to provide greater positive lift for takeoff. This, in turn, can reduce takeoff speed, and therefore takeoff distance.

Upon takeoff, once the main gear 705 has cleared the tarmac, the location of the main gear 705 is no longer relevant from an aerodynamic standpoint. Once aloft, the location of the main gear 705 is relevant only from a weights and balances standpoint, which can be accounted for with fuel, cargo, and/or passenger weight, among other things.

Of course, while shown and described with hydraulic cylinders 720, pneumatic cylinders and other types of linear or rotary actuators could be used. Landing gear system 700 could utilize linear actuators, for example, electrically driven by the aircraft's electrical system. Landing gear system 700 could also utilize servo motors, for example, with a rack and pinion or pushrod actuation to the landing gear 705, 710. Indeed, rather than using separate hydraulic cylinders 720, as shown, landing gear system 700 could use lengthened versions of the existing oleo struts 715 interconnected in a similar manner. This configuration might reduce weight and complexity if sufficient space is available in the airplane for the lengthy struts 715 and the volume swept by the rotation angle needed for retraction. Thus, any type of mechanism that can enable the main gear 705 to squat and/or the nose gear 710 to lift can provide the necessary AOA.

Figure 8:
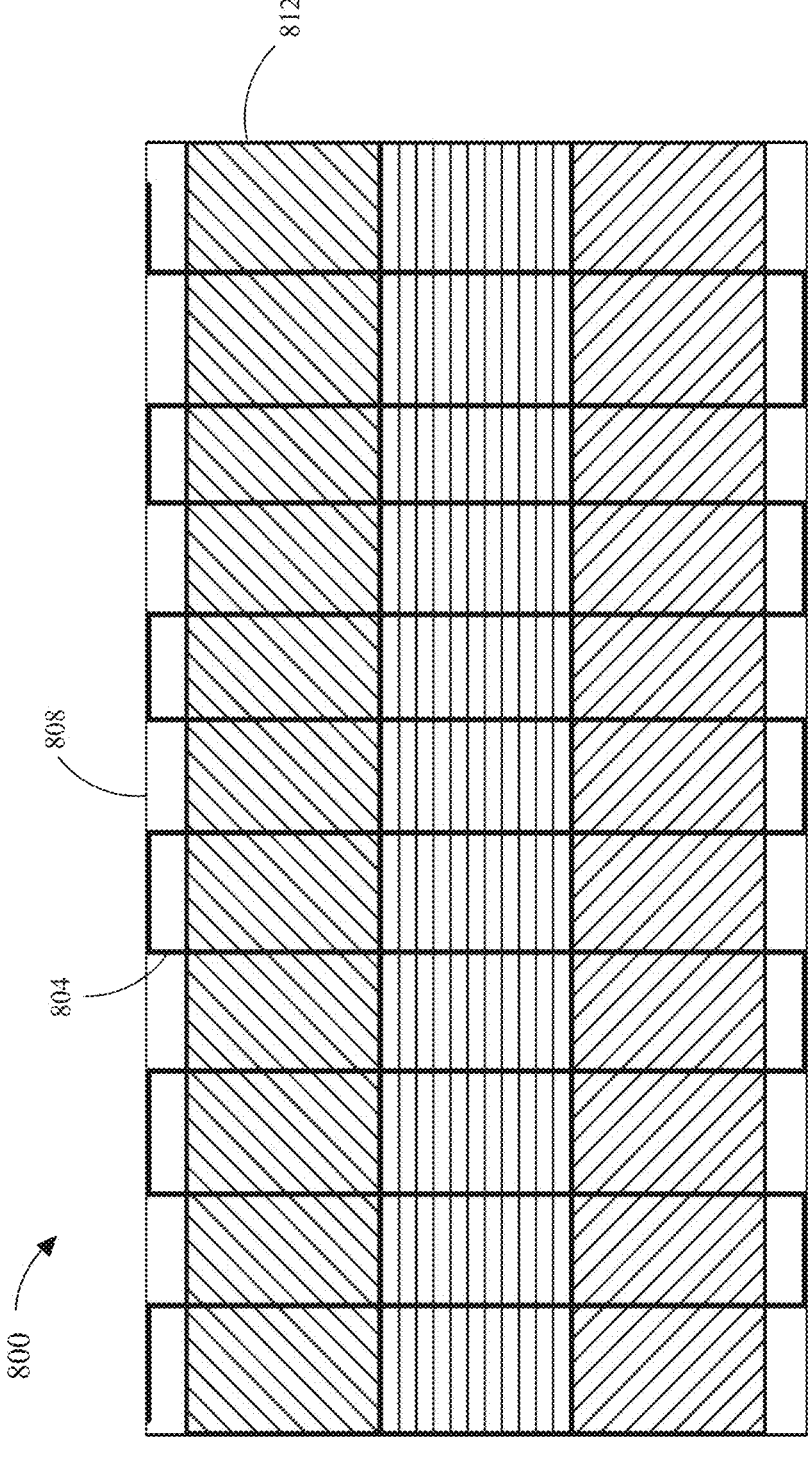
FIG. 8 is an exemplary embodiment of a carbon fiber material.

Referring now to FIG. 8, an exemplary embodiment of a carbon fiber material 800 is illustrated. Carbon fiber material 800 may contain at least one stitching 804 extending through first dry carbon fiber sheet 812. "Stitching" for the purposes of this disclosure refers to a material configured to extend through two or more materials and bind the two or more materials togethers. Stitching 804 may include any thread that may be configured to bind two or more materials together. Stitching 804 may include any material, such as but not limited to, carbon fiber, poly-fiber, polyester, Kevlar, aramid and/or a thermoplastic. In one or more embodiments, carbon fiber material 800 may include multiple stitching 804, wherein each stitching 804 may include similar or differing materials. In one or more embodiments, stitching 804 may include any material suitable for binding layers within first dry carbon fiber sheet 812 together. In one or more embodiments, stitching 804 is configured to bind first dry carbon fiber sheet 812 together such that layers within first dry carbon fiber sheet 812 are bound to one another. In some embodiments, stitching 804 may provide delamination resistance and improve damage tolerance of a composite material such as first dry carbon fiber sheet 812. In one or more embodiments, stitching 804 may extend through first dry carbon fiber sheet 812 wherein stitching 804 extends through the thickness of each layer of first dry carbon fiber sheet 812. In one or more embodiments, stitching 804 may provide for through-thickness reinforcement. In one or more embodiments, the through thickness reinforcement may prevent delamination and/or contain delamination within a particular area. In one or more embodiments, stitching 804 may contain delamination within a particular area, wherein a composite material such as first dry carbon fiber sheet 812 may not delaminate past a stitching 804. In one or more embodiments, delamination may occur wherein a carbon fiber material such as first dry carbon fiber sheet 812 is bonded to a structure.

With continued reference to FIG. 8, the effect of stitching 804 on first dry carbon fiber sheet 812 may be affected by parameters such as the stitch density, the stitch material, the thread density and the like. Stitch density as described in this disclosure refers to the number of stitches over a given area. A higher stitch density may minimize possibilities of delamination within first dry carbon fiber sheet 812. "Thread density" as described herein refers to the density of the thread used for stitching 804. In one or more embodiments, stitching 804 may be sown into first dry carbon fiber sheet 812 such that layers within first dry carbon fiber sheet 812 are bound together. In one or more embodiments, the stitching 804 extending through the first dry carbon fiber sheet 812 includes a stitching 804 style such a lock stitch or a modified lock stitch. A "lock stitch" for the purposes of this disclosure is a type of stitching process used in which two threads penetrate a material and interlock primarily within the material. A "modified lock stitch" for the purposes of this disclosure is stitching process in which two threads on opposing surfaces of a material interlock at one surface of the material. In a lock stitch, a top thread and a bottom thread penetrate a material and interlock within the material (ideally within the center of the material) thereby binding the material. In a modified lock stitch, the top thread and bottom thread interlock with each other at an edge of the material, such as at the top or at the bottom of the material. In one or more embodiments, a lock stitch and/or a modified lock stitch may prevent unraveling of a stitching 804 within first dry carbon fiber sheet 812. For example, a rip or unraveling of a stitching 804 within a particular area of first dry carbon fiber sheet 812 may be contained as the locks created by the interlocking of the top thread and bottom thread prevent the rip or unraveling of the stitching 804 from spreading. In both lock stitching 804 and modified lock stitching 804 a needle penetrates a first thread through the material and a hook catches the first thread and loops it around a second thread. The hook is sometimes referred to as the bobbin. In a modified lock stitch, the tension of the needle and/or the hook is decreased such that the threads interlock at an edge and/or surface of the material. In both a lock stitch and a modified lock stitch the needle thread and the bobbin thread must enter at opposite sides of the material such as opposite sides of first dry carbon fiber sheet 812. In one or more embodiments, a modified lock stitch may provide for increased bonding strength of a material. In one or more embodiments, the stitching 804 extending through the first dry carbon fiber sheet 812 may include a stitching 804 style such as tufting. "Tufting" for the purposes of this disclosure is the process of stitching a material through a primary surface in the form of a loop. A tufting process may include inserting a thread through a first surface of a material, looped within the first material or an opposing surface of the material and back through the first surface of the material. In tufting, a loop of the thread is typically left on an opposing surface of the material. Tufting may be contrasted with a lock stitch or a modified lock stitch in that tufting requires only requires a single thread penetrating only one side of the material. In tufting the loops created by the thread are not interlocked and instead remain in place due to friction between the thread and the material. In one or more embodiments, stitching 804 may be partially inserted into first dry carbon fiber sheet 812 wherein stitching 804 is looped within first dry carbon fiber sheet 812 and returned to the surface. In one or more embodiments, stitching 804 may be completely inserted into first dry carbon fiber sheet 812 wherein stitching 804 is inserted through one surface and looped on an opposing surface prior to returning through the inserting surface. In one or more embodiments, stitching 804 may extend through first dry carbon fiber sheet 812 using a tufting needle wherein the tufting needle is configured to insert stitching 804 through an inserting surface and loop the stitching 804 within first dry carbon fiber sheet 812. In one or more embodiments, stitching 804 may be inserted orthogonally to a surface of first dry carbon fiber sheet 812. In one or more embodiments, stitching 804 may be inserted non-parallel to first dry carbon fiber sheet 812. In one or more embodiments, stitching 804 may be inserted into first dry carbon fiber sheet 812 at a 88-degree angle.

With continued reference to FIG. 8, carbon fiber material 800 further includes a resin matrix 808, wherein the stitching 804 and the first dry carbon fiber sheet 812 are embedded within the resin matrix 808 to create a single unified structure. "Resin" as described in this disclosure is a compound consisting of a non-crystalline or viscous liquid substance. Resin may be reacted with a curing agent or a hardener in order to create a solid material. In some embodiments, resin may include vinylester resins, epoxy resins or any other lightweight resins with durability suitable for aircraft. "Matrix" for the purposes of this disclosure is a material in which a reinforcement material is embedded into such that the matrix binds the reinforcement material and provides the reinforcement material with a defined shape. "Resin matrix" for the purposes of this disclosure is a containing resin wherein reinforcement material is embedded into the resin. In one or more embodiments, resin matrix 808 may include a resin wherein a reinforcement material such as the first dry carbon fiber cloth, along with the stitching 804 are embedded into resin matrix 808 to bind the first dry carbon fiber cloth and the stitching 804 to provide a shape. Resin matrix 808 may include any resin and/or resin matrix 808 as described within this disclosure. Resin may be a liquid that is poured and used to create a shape. Resin may then be cured to maintain a desired shape. Resin may be poured over first dry carbon sheet such that first dry carbon fiber sheet 812 along with the stitching 804 is embedded into a layer of resin. Resin may provide for reinforcement of first dry carbon fiber sheet 812 and ensure that carbon fibers within first dry carbon fiber sheet 812 do not change orientation. In one or more embodiments, first dry carbon fiber sheet 812, stitching 804, and resin matrix 808 may be combined to create a single unified structure. "A single unified structure" for the purposes of this disclosure is a part and/or component having multiple elements that are bound together to create a single product. Carbon fiber material 800 may contain a single unified structure wherein elements of carbon fiber material 800 cannot be easily interchanged and/or modified. In one or more embodiments, single unified structure may include a product wherein each element cannot be removed without destroying or damaging the structure. In one or more embodiments, single unified structure may include a product that contains multiple parts that all move in tandem with one another. In one or more embodiments, single unified structure may include a part wherein each element is dependent on at least another element within the part. In one or more embodiments, carbon fiber material 800 may be a single unified structure wherein carbon fiber material 800 is molded such that elements within the resin matrix 808 are bound together. In this embodiment, resin matrix 808 may be cured such that stitching 804, and first dry carbon fiber sheet 812 are bound within the resin matrix 808. In one or more embodiments, carbon fiber material 800 may include a molded part, wherein the molded part includes a composite created within a mold. In one or more embodiments, first dry carbon fiber sheet 812, resin matrix 808 and stitching 804 may be placed within a mold and cured in order to create a molded part and/or carbon fiber material 800.

With continued reference to FIG. 8, the resin matrix 808 may be cured through a molding process. "Molding" as described herein refers to the formation of an object. In some embodiments, molding may include formation of an object using malleable material. Molding may include pouring resin into a mold to create a part. Molding may further include pouring resin into a mold and curing the mold. Molding may include a Resin Transfer Molding. Resin Transfer Molding as described is a closed molding process wherein resin is injected into a mold having a dry composite, first dry carbon fiber sheet 812, and clamped together. Continuing, a vacuum is then applied to the mold to remove any air and ensure that the dry composite has been properly infused. In some embodiments, molding may include compression molding. Compression molding as described herein is process in which a molding material such as resin is placed into an open mold and compressed from an open end of the mold. In some embodiments, molding may include a Vacuum Infusion Process (VIP). In one or more embodiments, first dry carbon fiber sheet 812 and stitching 804 may be embedded into resin matrix 808 using VIP. "Vacuum infusion process," as described herein, refers to a closed molding process in which resin is infused into a mold using a vacuum to draw the resin into the mold. VIP includes placing a dry composite, such as first dry carbon fiber sheet 812 and stitching 804, into a mold and infusing the sheets with a resin. In a vacuum infusion process, air pockets and any other voids are removed, and resin is drawn into the mold. In a vacuum infusion process, the dry composite is first placed into a mold and the resin is drawn into a mold such that the resin takes the form of the mold. In a vacuum infusion process, the dry composite may be compacted using a vacuum before the resin is drawn in. A vacuum infusion process may be preferred in materials that require a higher concentration of dry composites or reinforcement material in comparison to resin. In a vacuum infusion process voids may be minimized as air pockets are sucked out prior to the resin being drawn into the laminate.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
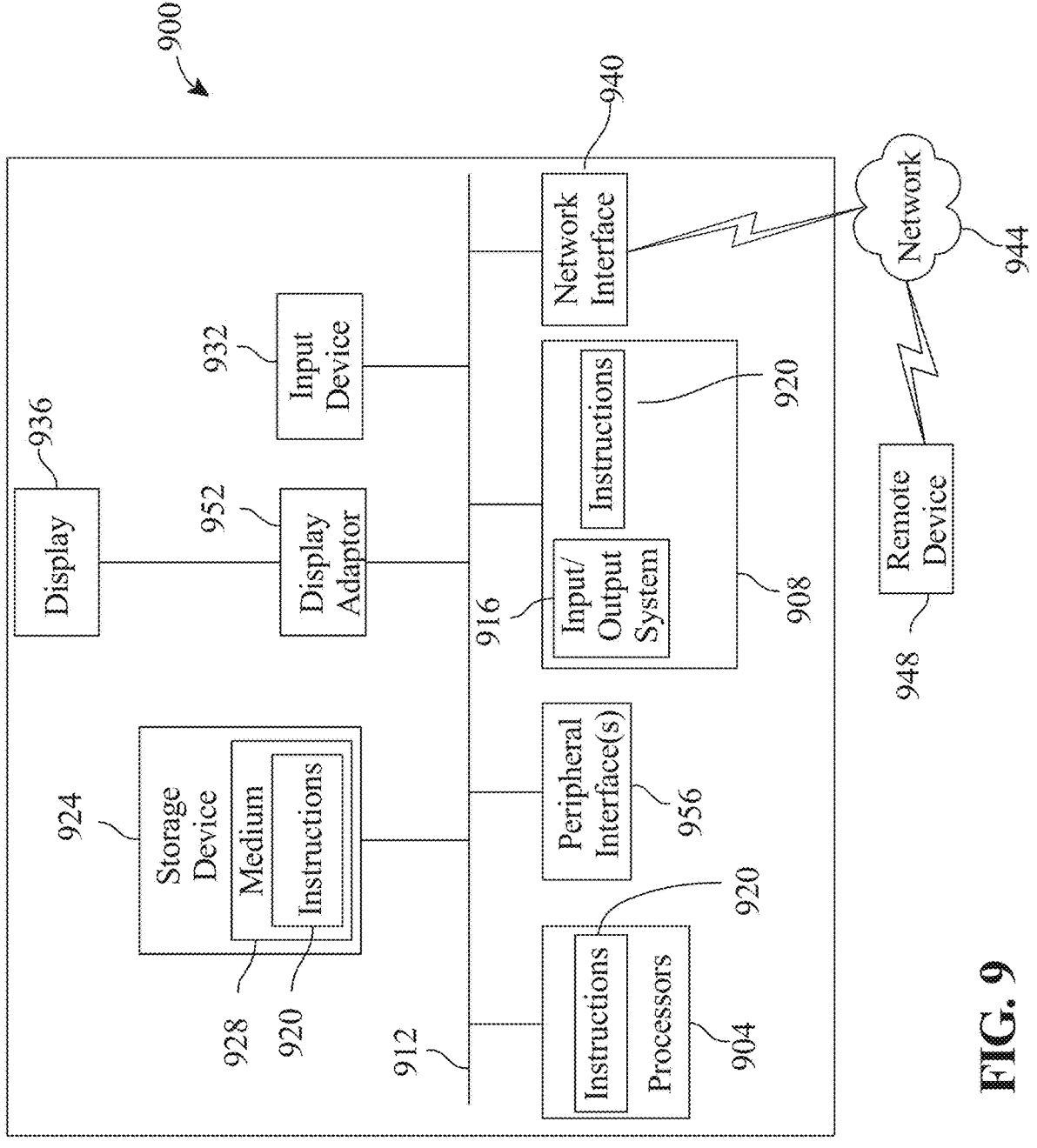
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1395 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940 may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft comprising:
a blended wing body (BWB) having a main body and wings with no clear demarcation between the wings and the main body along a leading edge of the aircraft;
a pressurized passenger cabin located within the main body;
a rear spar located within the main body and configured to form a portion of the pressurized passenger cabin;
an unpressurized convergent aft centerbody located aft of the rear spar;
one or more ribs located within the convergent aft centerbody, wherein the one or more ribs are connected to the rear spar;
one or more gear wells located aft of the rear spar and on a lower surface of the aircraft;
a landing gear system comprising at least one main gear, the at least one main gear situated in one of the one or more gear wells, wherein the at least one main gear is connected to the one or more ribs within the convergent aft centerbody;
one or more propulsors located directly above the one or more gear wells, wherein at least one propulsor of the one or more propulsors is located over at least one gear well of the one or more gear wells; and
at least one engine support structure each configured to mount one of the one or more propulsors on the BWB.

2. The aircraft of claim 1, wherein the at least one main gear is connected to fittings on the rear spar.

3. The aircraft of claim 1, wherein the one or more propulsors are located on an upper surface of the convergent aft centerbody.

4. The aircraft of claim 1, wherein:
the landing gear system further comprises:
a nose gear disposed proximate a front of the aircraft, the nose gear controllably movable between a first position in which the nose gear is at an upper limit, and a second position in which the nose gear is at a lower limit; and
the at least one main gear disposed proximate a rear of the aircraft, the at least one main gear controllably movable between a third position, in which the at least one main gear is at a lower limit, and a fourth position, in which the at least one main gear is at an upper limit;

in a ground position, the nose gear is in the first position and the at least one main gear is in the third position and a fuselage of the aircraft is substantially level with a ground surface; and in a high lift position, the nose gear is in the second position and the at least one main gear is in the fourth position and the fuselage of the aircraft is rotated to a positive deck angle with respect to the ground surface.

5. The aircraft of claim 4, wherein in the third position and in the fourth position the at least one main gear is extended outside one gear well of the one or more gear wells.

6. The aircraft of claim 1, wherein the main body comprises one or more cabin bays.

7. The aircraft of claim 1, wherein an outer mold line of the BWB is formed by a carbon fiber material.

8. The aircraft of claim 1, wherein:

the one or more gear wells are located on at least the lower surface of the convergent aft centerbody and extend through an upper surface of the convergent aft centerbody.

9. The aircraft of claim 1, wherein the one or more ribs are substantially orthogonal to the rear spar.

10. An aircraft comprising:

a blended wing body (BWB) having a main body and wings with no clear demarcation between the wings and the main body along a leading edge of the aircraft;

a rear spar located within the main body;

one or more gear wells located aft of the rear spar, wherein at least one gear well of the one or more gear wells extend from an opening at a lower surface of the aircraft and through an opening at an upper surface of the aircraft;

a landing gear system comprising at least one main gear, the at least one main gear situated in at least one of the one or more gear wells;

at least one propulsor situated aft of the rear spar and on the upper surface of aircraft, wherein the at least a propulsor is located over the at least one gear well of the one or more gear wells; and at least one engine support structure each configured to mount the at least one propulsor on the BWB.

11. The aircraft of claim 10, wherein the at least one engine support structure is constructed from additively manufactured polymer material with a carbon fiber exterior.

12. The aircraft of claim 10, wherein:

the aircraft further comprises a convergent aft centerbody aft of the rear spar; and the at least one main gear is connected to a rib of the convergent aft centerbody.

13. The aircraft of claim 10, wherein:

the landing gear system further comprises:

a nose gear disposed proximate a front of the aircraft, the nose gear controllably movable between a first position in which the nose gear is at an upper limit, and a second position in which the nose gear is at a lower limit; and the main gear disposed proximate a rear of the aircraft, the main gear controllably movable between a third position, in which the main gear is at a lower limit, and a fourth position, in which the main gear is at an upper limit;

in a ground position, the nose gear is in the first position and main gear is in the third position and a fuselage of the aircraft is substantially level with a ground surface; and in a high lift position, the nose gear is in the second position and the main gear is in the fourth position and the fuselage of the aircraft is rotated to a positive deck angle with respect to a ground surface.

14. The aircraft of claim 13, wherein at a lower limit, the at least one propulsor may pass from the opening at the upper surface and through the opening at the lower surface.

15. The aircraft of claim 10, wherein an outer mold line of the BWB is formed by a carbon fiber material.

16. The aircraft of claim 10, wherein the BWB comprises a single deck wherein passengers and cargo are located on or above the single deck.

17. The aircraft of claim 10, wherein the rear spar comprises a pressure bulkhead for a pressure vessel.

18. The aircraft of claim 10, wherein the main body comprises one or more cabin bays.

* * * * *